(12) United States Patent
Beale et al.

(10) Patent No.: US 10,595,296 B2
(45) Date of Patent: Mar. 17, 2020

(54) TELECOMMUNICATIONS APPARATUS AND METHODS FOR DETERMINING LOCATION OF TERMINAL DEVICE USING BEAM SWEEPING

(71) Applicant: Sony Corporation, Tokyo (JP)

(72) Inventors: Martin Warwick Beale, Basingstoke (GB); Shin Horng Wong, Basingstoke (GB)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/324,646

(22) PCT Filed: Jul. 19, 2017

(86) PCT No.: PCT/EP2017/068260
§ 371 (c)(1),
(2) Date: Feb. 11, 2019

(87) PCT Pub. No.: WO2018/028960
PCT Pub. Date: Feb. 15, 2018

(65) Prior Publication Data
US 2019/0182798 A1 Jun. 13, 2019

(30) Foreign Application Priority Data
Aug. 12, 2016 (EP) .................................. 16184120

(51) Int. Cl.
*H04W 24/00* (2009.01)
*H04W 64/00* (2009.01)
(Continued)

(52) U.S. Cl.
CPC ........ *H04W 64/006* (2013.01); *H04B 7/0491* (2013.01); *H04B 7/0634* (2013.01);
(Continued)

(58) Field of Classification Search
CPC .. H04W 64/006; H04W 88/04; H04B 7/0491; H04B 7/0634; H04B 7/0695; H04M 1/72519; H04M 1/72522
(Continued)

(56) References Cited

U.S. PATENT DOCUMENTS 6,141,335 A 10/2000 Kuwahara et al.
6,233,466 B1 5/2001 Wong et al.
(Continued)

FOREIGN PATENT DOCUMENTS

WO 2018/001663 A1 1/2018

OTHER PUBLICATIONS

Nokia, Alcatel-Lucent Shanghai Bell, "Support for Beam Based Common Control Plane in 5G New Radio", 3GPP TSG-RAN WG1 #84bis R1-162895, Busan, Korea, Apr. 11-15, 2016, 4 pages.
(Continued)

*Primary Examiner* — Danh C Le
(74) *Attorney, Agent, or Firm* — Xsensus LLP

(57) ABSTRACT

Infrastructure equipment for use with a wireless telecommunications system, the infrastructure equipment operable to transmit a first radio signal to a terminal device located within one of a plurality of predetermined geographical regions, wherein the value of one or more predetermined parameters indicative of the one of the plurality of predetermined geographical regions within which the terminal device is located is determinable by the terminal device on the basis of the first radio signal, each of the plurality of predetermined geographical regions being associated with a different respective value of the one or more predetermined parameters which is indicative of that predetermined geographical region.

19 Claims, 17 Drawing Sheets

(51) Int. Cl.
*H04B 7/06* (2006.01)
*H04B 7/0491* (2017.01)
*H04M 1/725* (2006.01)
*H04W 88/04* (2009.01)

(52) U.S. Cl.
CPC ....... *H04B 7/0695* (2013.01); *H04M 1/72519* (2013.01); *H04M 1/72522* (2013.01); *H04W 88/04* (2013.01)

(58) Field of Classification Search
USPC ................................ 455/562.1, 550.1, 456.1
See application file for complete search history.

(56) References Cited

U.S. PATENT DOCUMENTS

| | | | | |
|---|---|---|---|---|
| 7,123,924 | B2* | 10/2006 | Cuffaro | G01S 5/02 455/456.1 |
| 2004/0002363 | A1* | 1/2004 | Cuffaro | H04B 7/04 455/562.1 |
| 2006/0189355 | A1 | 8/2006 | Cuffaro | |
| 2011/0205969 | A1 | 8/2011 | Ahmad et al. | |
| 2014/0287772 | A1* | 9/2014 | Saunders | H04W 4/029 455/456.1 |
| 2014/0349630 | A1* | 11/2014 | Hyde | H04B 7/026 455/418 |
| 2015/0078189 | A1 | 3/2015 | Kwon et al. | |
| 2016/0087743 | A1* | 3/2016 | El Ayach | H04W 52/242 455/452.1 |
| 2017/0055273 | A1* | 2/2017 | Sharma | H04W 72/085 |
| 2017/0303278 | A1* | 10/2017 | Calin | H04W 4/30 |
| 2017/0374637 | A1* | 12/2017 | Akkarakaran | H04B 7/0617 |
| 2018/0160334 | A1* | 6/2018 | Deshpande | H04W 28/08 |
| 2018/0324738 | A1* | 11/2018 | Stirling-Gallacher | G01S 5/0236 |
| 2019/0053314 | A1* | 2/2019 | Zhou | H04B 7/0695 |

OTHER PUBLICATIONS

Nokia, Alcatel-Lucent Shanghai Bell, "Support for Beam Based Common Control Plane", 3GPP TSG-RAN NG1#85 R1-165364, Nanjing, P.R. China, May 23-27, 2016, 5 pages.

Nokia, Alcatel-Lucent Shanghai Bell, "On beam sweeping and its implications", 3GPP TSG-RAN WG2 Meeting #94 R2-163443, Nanjing, China, May 23-27, 2016, 4 pages.

NTT DOCOMO, "New SID Proposal: Study on New Radio Access Technology", 3GPP TSG RAN Meeting No. 71 RP-160671, Göteborg, Sweden, Mar. 7-10, 2016, 8 pages.

Sesia et al., "LTE—The UMTS Long Term Evolution", Second Edition including release 10 for LTE-Advanced, Wiley, 2011, 794 pages.

Holma et al., "LTE for UMTS OFDMA and SC-FDMA Based Radio Access", System Architecture based on 3GPP SAE, ISBN 978-0-470-99401-6, Wiley 2009, 11 pages.

3GPP, "Evolved Universal Terrestrial Radio Access (E-UTRA); LTE Positioning Protocol (LPP)", 3GPP TS 36.355 version 13.1.0 Release 13, Apr. 2016, 142 pages.

International Search Report dated Jan. 2, 2018 for PCT/EP2017/068260 filed on Jul. 19, 2017, 17 pages.

* cited by examiner

UE location estimated to be within coverage areas intersected by beams {ID2,block2} for eNodeB1 and {ID2,block1} for eNodeB2

TELECOMMUNICATIONS APPARATUS AND METHODS FOR DETERMINING LOCATION OF TERMINAL DEVICE USING BEAM SWEEPING

CROSS-REFERENCE TO RELATED APPLICATIONS

The present application is based on PCT filing PCT/EP2017/068260, filed Jul. 19, 2017, and claims priority to 16184120.0, filed in the European Patent Office on Aug. 12, 2016, the entire contents of each of which being incorporated herein by reference.

BACKGROUND

Field

The present disclosure relates to telecommunications apparatus and methods.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Third and fourth generation mobile telecommunication systems, such as those based on the 3GPP defined UMTS and Long Term Evolution (LTE) architecture are able to support more sophisticated services than simple voice and messaging services offered by previous generations of mobile telecommunication systems. For example, with the improved radio interface and enhanced data rates provided by LTE systems, a user is able to enjoy high data rate applications such as mobile video streaming and mobile video conferencing that would previously only have been available via a fixed line data connection. The demand to deploy third and fourth generation networks is therefore strong and the coverage area of these networks, i.e. geographic locations where access to the networks is possible, is expected to increase rapidly. However, whilst fourth generation networks can support communications at high data rate and low latencies from devices such as smart phones and tablet computers, it is expected that future wireless communications networks, will be expected to efficiently support communications with a much wider range of devices associated with a wider range of data traffic profiles, for example including reduced complexity devices, machine type communication devices, high resolution video displays and virtual reality headsets. Some of these different types of devices may be deployed in very large numbers, for example low complexity devices for supporting the "The Internet of Things", and may typically be associated with the transmissions of relatively small amounts of data with relatively high latency tolerance, whereas other types of device, for example supporting high-definition video streaming, may be associated with transmissions of relatively large amounts of data with relatively low latency tolerance.

There is therefore expected to be a desire for future wireless communications networks, which may be referred to as 5G or new radio access technology (which may be denoted new RAT or, simply, NR) networks, to efficiently support connectivity for a wide range of devices associated with different applications with different characteristic data traffic profiles, resulting in different devices have different operating characteristics/requirements, such as:

High latency tolerance
High data rates
Millimetre wave spectrum use
High density of network nodes (e.g. small cell and relay nodes)
Large system capacity
Large numbers of devices (e.g. MTC devices/Internet of Things devices)
High reliability (e.g. for vehicle safety applications, such as self-driving cars).
Low device cost and energy consumption
Flexible spectrum usage
Flexible mobility The introduction of new radio access technology (RAT) systems/networks therefore gives rise to new challenges. One such challenge is the need to develop effective techniques for determining the geographical position of a terminal device (also known as user equipment (UE)) of an NR network.

SUMMARY

The present disclosure can help address or mitigate at least some of the issues discussed above.

Respective aspects and features of the present disclosure are defined in the appended claims.

It is to be understood that both the foregoing general description and the following detailed description are exemplary, but are not restrictive, of the present technology. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and wherein.

DESCRIPTION OF EXAMPLE EMBODIMENTS

Figure 1:
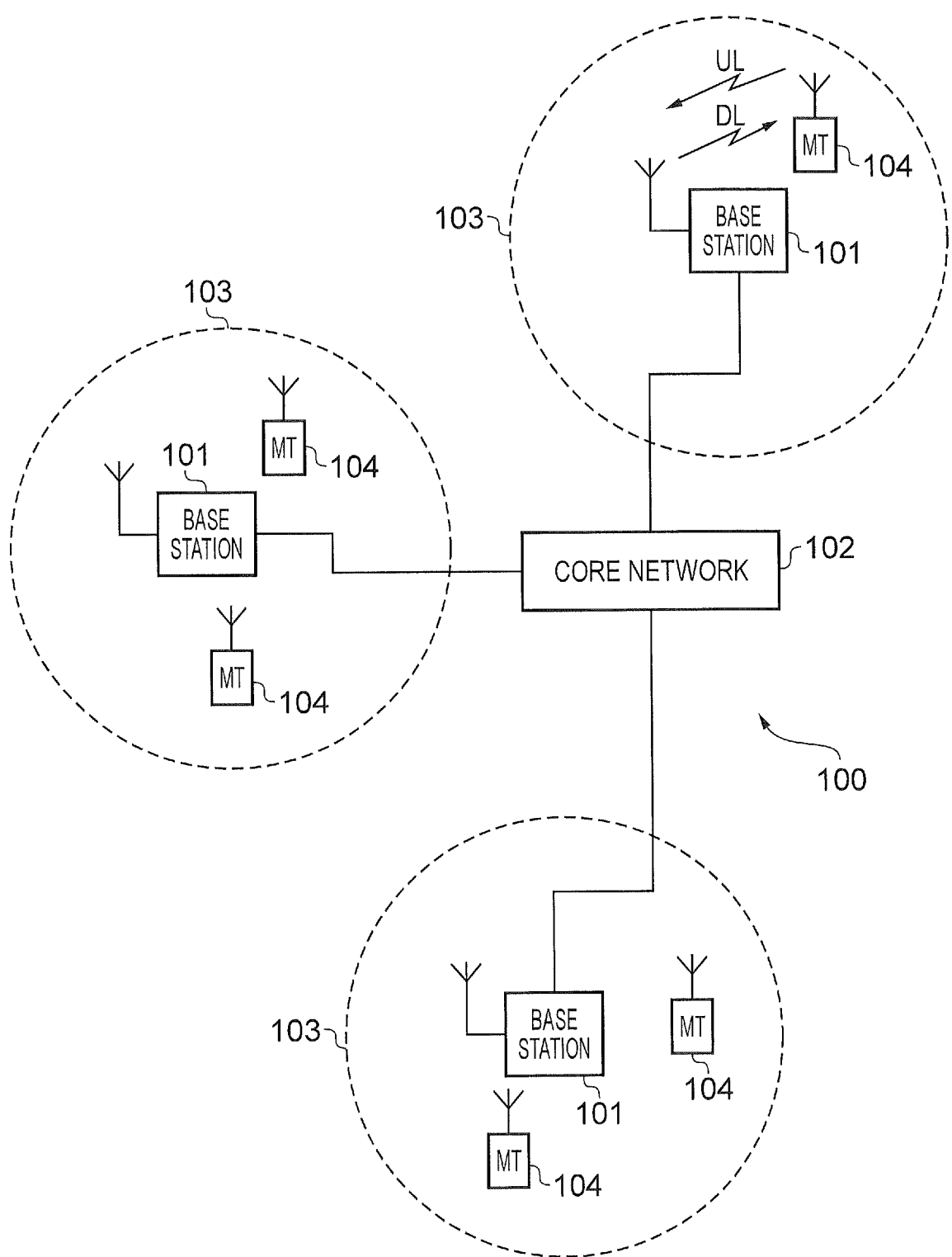
FIG. 1 schematically represents some elements of a conventional LTE-based mobile telecommunications network/system.

FIG. 1 is a schematic diagram illustrating a network architecture for an LTE-based wireless mobile telecommunications network/system 100. Various elements of FIG. 1 and their respective modes of operation are well-known and defined in the relevant standards administered by the 3GPP (RTM) body, and also described in many books on the subject, for example, Holma H. and Toskala A [1]. It will be appreciated that operational aspects of the telecommunications network represented in FIG. 1, and of other networks discussed herein in accordance with embodiments of the disclosure, which are not specifically described (for example in relation to specific communication protocols and physical channels for communicating between different elements) may be implemented in accordance with any known techniques, for example according to currently used approaches for implementing such operational aspects of wireless telecommunications systems, e.g. in accordance with the relevant standards.

The network 100 includes a plurality of base stations 101 connected to a core network 102. Each base station provides a coverage area 103 (i.e. a cell) within which data can be communicated to and from terminal devices 104. Data is transmitted from base stations 101 to terminal devices 104 within their respective coverage areas 103 via a radio downlink. Data is transmitted from terminal devices 104 to the base stations 101 via a radio uplink. The core network 102 routes data to and from the terminal devices 104 via the respective base stations 101 and provides functions such as authentication, mobility management, charging and so on.

Terminal devices may also be referred to as mobile stations, user equipment (UE), user terminal, mobile radio, communications device, and so forth. Base stations, which are an example of network infrastructure equipment, may also be referred to as transceiver stations/nodeBs/e-nodeBs (eNBs), and so forth.

In terms of broad top-level functionality, the network architecture of a new RAT will have a similar general arrangement to that shown for current LTE networks in FIG. 1. In particular, a new RAT network architecture will include a core network component, a number of base stations and a number of terminal devices which operate together so as to allow exchange of data between terminal devices on the network. It will be appreciated that operational aspects of a new RAT network (for example in relation to specific communication protocols and physical channels for communicating between different elements) may be different to those known from LTE or other known mobile telecommunications standards. However, it will also be appreciated that each of the core network component, base stations and terminal devices of a new RAT network will be functionally similar to, respectively, the core network component, base stations and terminal devices of FIG. 1. In particular, in the new RAT, each base station will be connected to the core network. Each base station will provide a coverage area (i.e. a cell) within which data can be communicated to and from terminal devices. Data will be transmitted from base stations to terminal devices within their respective coverage areas via a radio downlink. Data will be transmitted from terminal devices to the base stations via a radio uplink. The core network will route data to and from the terminal devices via the respective base stations. This functional equivalence is sufficient for an understanding of the present technique.

With regard to the determining of a geographical position of a terminal device in existing networks, various methods have been specified in previous 3GPP releases. These include, for example, UTDOA (Uplink Time Difference of Arrival), OTDOA (Observed Time Difference of Arrival), basic CID (cell-ID) positioning (wherein the position of the UE is estimated as the position of the cell that is serving the base station) and E-CID (Enhanced cell-ID) positioning. There are two versions of E-CID positioning. Firstly, there is E-CID using Round Trip Time (RTT) and Receive Level Measurements (described in [2] section 19.4.2, for example). In this case, the position of the UE is determined based on the round trip time of the signal between the eNodeB and the UE (e.g. measured at the eNodeB on the PRACH preamble) and receive level measurements performed by the UE (e.g. the measured RSRP). The RTT allows the eNodeB to determine the distance of the UE from the eNodeB and the RSRP values allows the eNodeB to determine a more accurate position estimate, e.g. based on a map of RSRP values within the cell. Secondly, there is E-CID using RTT and Angle of Arrival (described in [2] section 19.4.2, for example). In this case, the position of the UE is determined based on the round trip time of the signal between the eNodeB and the UE (e.g. measured at the eNodeB on the PRACH preamble) and the angle of arrival of the signal at the eNodeB (this can be determined when the eNodeB has multiple receive antennas).

Figure 2:
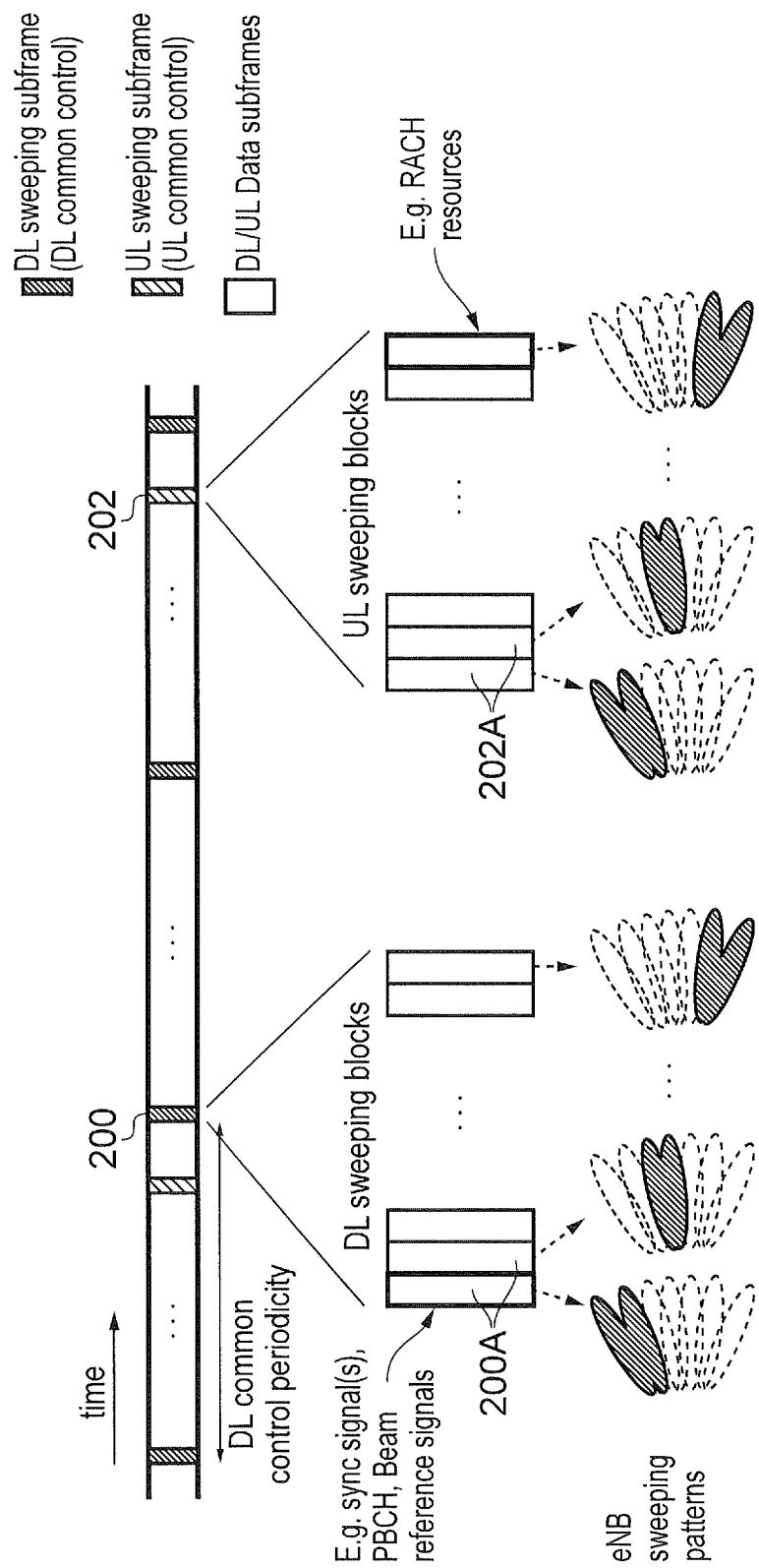
FIG. 2 schematically illustrates an example of uplink and downlink beam sweeping functionality.

In 3GPP a Study Item (SI) on New Radio Access Technology (NR) has been agreed [3]. This SI is to study and to develop a new Radio Access Technology (RAT) for the next generation wireless communication system, i.e. 5G. The new RAT is expected to operate in a large range of frequencies, from hundreds of MHz to 100 GHz and it is expected to cover a broad range of use cases. It has been proposed in [4] that, in NR, common control signalling is transmitted in a beam-swept manner. This applies to both the downlink DL (where SYNC, system information, paging and other common control signalling is transmitted) and the uplink UL (where random access, RACH, common control messages are transmitted). The beam sweeping functionality is shown in FIG. 2 (from [4]). The figure shows that there are some DL sweeping subframes 200 and within those subframes, the beam direction with respect to the base station sweeps. The figure also shows UL sweeping subframes 202, and within those subframes, the beam direction with respect to the base station sweeps. Each DL sweeping subframe may consist of one or more sweeping blocks 200A. The beam direction can be the same within a block, but within different blocks in the subframe, the beam direction changes. Similarly, each UL sweeping subframe may consist of one or more sweeping blocks 202A. The beam direction can be the same within a block, but within different blocks in the subframe, the beam direction changes.

Figure 3:
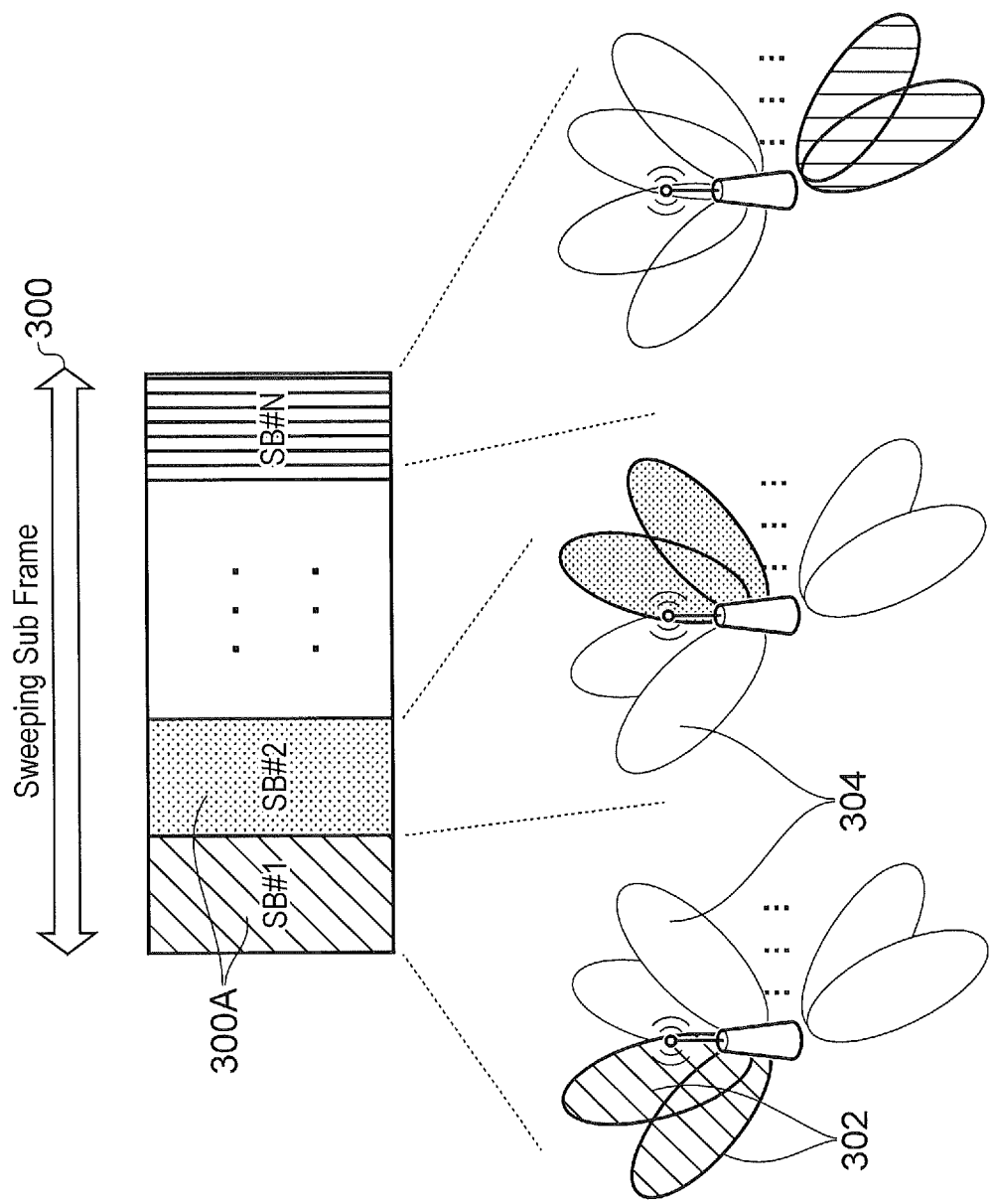
FIG. 3 schematically illustrates the concept of sweeping blocks within a sweeping subframe.

[5] also illustrates the concept of sweeping blocks (in which beams are transmitted in different geographical locations) within a sweeping subframe, as is shown in FIG. 3. Here, it can be seen that, for each sweeping block 300A of a sweeping subframe, there will be one or more active beams 302 and one or more inactive beams 304. It will be appreciated that the term "beam" should generally be understood to mean a predetermined geographical region towards which an infrastructure equipment may transmit signals and from which the infrastructure equipment may receive signals. When a beam is "active", the infrastructure equipment is able to exchange signals with a terminal device located within that predetermined geographical region. On the other hand, when a beam is "inactive", the infrastructure equipment is not able to exchange signals with a terminal device located within that predetermined geographical region.

In [6], it is taught that each beam might have beam-specific reference signals allowing each beam to be self-decodable and allowing the identity of each beam to be determined by the UE. The number of beams per sweeping block and the number of beams per sweeping subframe may be configured by the eNodeB.

Figure 4:
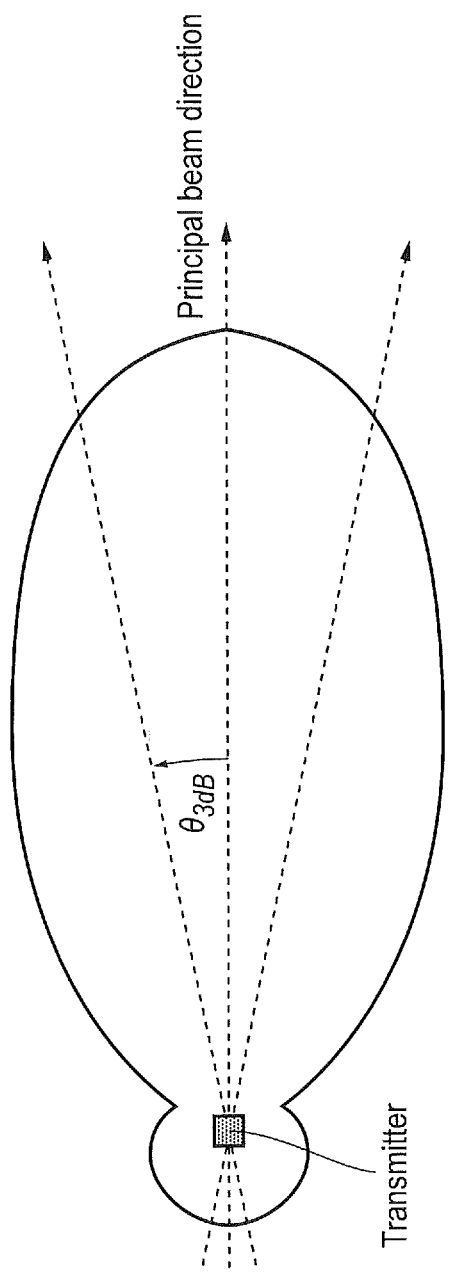
FIG. 4 schematically illustrates an example of a radiation pattern generated for a beam.

The shape of the beam produced by the eNodeB does not have a constant gain throughout the beam width. For example, the beam can be modelled as having the following gain 'A' at a given angle θ:

$$A(\theta) = -\min\left[12\left(\frac{\theta}{\theta_{3dB}}\right)^2, A_m\right],$$

where −180≤θ≤180.
Here, min[ ] is the minimum function, $\theta_{3\ dB}$ is the 3 dB beam width, and $A_m$ is a constant. This is illustrated in FIG. 4 (the transmitter element of the eNB shown in this figure may, in an implementation, be formed from a one or more transmit antenna elements, for example).

The present technique relates to determining a UE location in a wireless telecommunications system employing beam sweeping.

Figure 5:
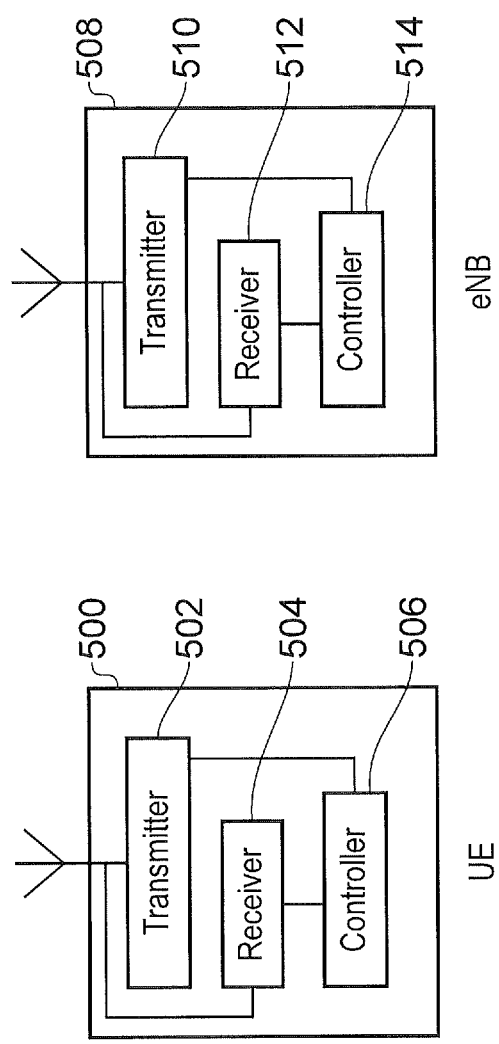
FIG. 5A schematically shows an example of a terminal device according to an embodiment.
FIG. 5B schematically shows an example of infrastructure equipment according to an embodiment.

FIG. 5A shows a terminal device 500 according to the present technique. The terminal device 500 comprises a transmitter 502 configured to transmit wireless signals, a receiver 504 configured to receive wireless signals and a controller 506 configured to control the terminal device 500. The transmitter 502 and receiver 504 together form a transceiver.

In an embodiment, the receiver 504 is operable to receive, when the terminal device 500 is located within one of a plurality of predetermined geographical regions, a first radio signal from an infrastructure equipment of the wireless telecommunications system. Each of the plurality of predetermined geographical regions is a beam generated by the infrastructure equipment. The controller 506 is operable to determine, on the basis of the first radio signal, the value of one or more predetermined parameters indicative of the one of the plurality of predetermined geographical regions within which the terminal device is located. Each of the plurality of predetermined geographical regions is associated with a different respective value of the one or more predetermined parameters which is indicative of that predetermined geographical region. The transmitter 502 is operable to transmit a second radio signal to the infrastructure equipment. The second radio signal is generated by the controller 506 on the basis of the value of the one or more predetermined parameters indicative of the one of the plurality of predetermined geographical regions within which the terminal device is located. The one of the plurality of predetermined geographical regions within which the terminal device is located is determinable by the infrastructure equipment on the basis of the second radio signal.

FIG. 5B shows an NR eNB 508, which is an example of an infrastructure equipment according to the present technique (infrastructure equipment of the present technique forming a Transmission and Reception Point (TRP) of the network). The eNB 508 comprises a transmitter 510 configured to transmit wireless signals, a receiver 512 configured to receive wireless signals and a controller 514 configured to control the eNB 508. The transmitter 510 and receiver 512 together form a transceiver.

In an embodiment, the transmitter 510 is operable to transmit a first radio signal to a terminal device located within one of a plurality of predetermined geographical regions. Each of the plurality of predetermined geographical regions is a beam generated by the eNB 508. The value of one or more predetermined parameters indicative of the one of the plurality of predetermined geographical regions within which the terminal device is located is determinable by the terminal device on the basis of the first signal. Each of the plurality of predetermined geographical regions is associated with a different respective value of the one or more predetermined parameters which is indicative of that predetermined geographical region. The receiver 512 is operable to receive a second radio signal from the terminal device located within the one of the plurality of predetermined geographical regions. The second radio signal is generated by the terminal device on the basis of the value of the one or more predetermined parameters indicative of the one of the plurality of predetermined geographical regions, the value of the one or more predetermined parameters being determined by the terminal device on the basis of the first radio signal. The controller 514 is operable to determine the one of the plurality of predetermined geographical regions within which the terminal device is located on the basis of the second radio signal.

Various embodiments of the present technique will now be discussed. Please note that, in the following description, the terms "predetermined geographical region" and "beam" are used interchangeably.

From the above description, it will be clear that, with the present technique, the location of a UE is determined using the first and second radio signals to identify the beam within which the UE is located. In addition, and as will be explained, further information can be used to determine the position of the UE even more accurately. Such further information includes, for example, the round trip time (RTT) of transmissions between the UE and eNodeB, the identities of beams detected from other eNodeBs, and the power levels of beams received in sweeping blocks or sweeping subframes.

In one embodiment the UE uses the first radio signal to determine the identity of the beam and the transmission time of the first radio signal. The UE then reports this back to the eNB using the second radio signal. This is advantageous in the case that multiple beams are transmitted at the same time. The beam identity (also known as a beam identifier or beam ID) may be signalled by the first radio signal via various methods, including, for example, through the use of a beam-specific reference signal contained in the first radio signal, through the use of a "beam identity" field carried on a physical channel used for transmission of the first radio signal within the beam, or by scrambling the first radio signal using a predetermined scrambling code associated with the beam identity. The transmission time of the first radio signal (in other words, the time at which the first radio signal is transmitted from the eNB to the UE) may be determined on the basis of an index of the sweeping block or sweeping subframe used for transmission of the first radio signal, since the index of the sweeping block or sweeping subframe increases with time.

Figure 6:
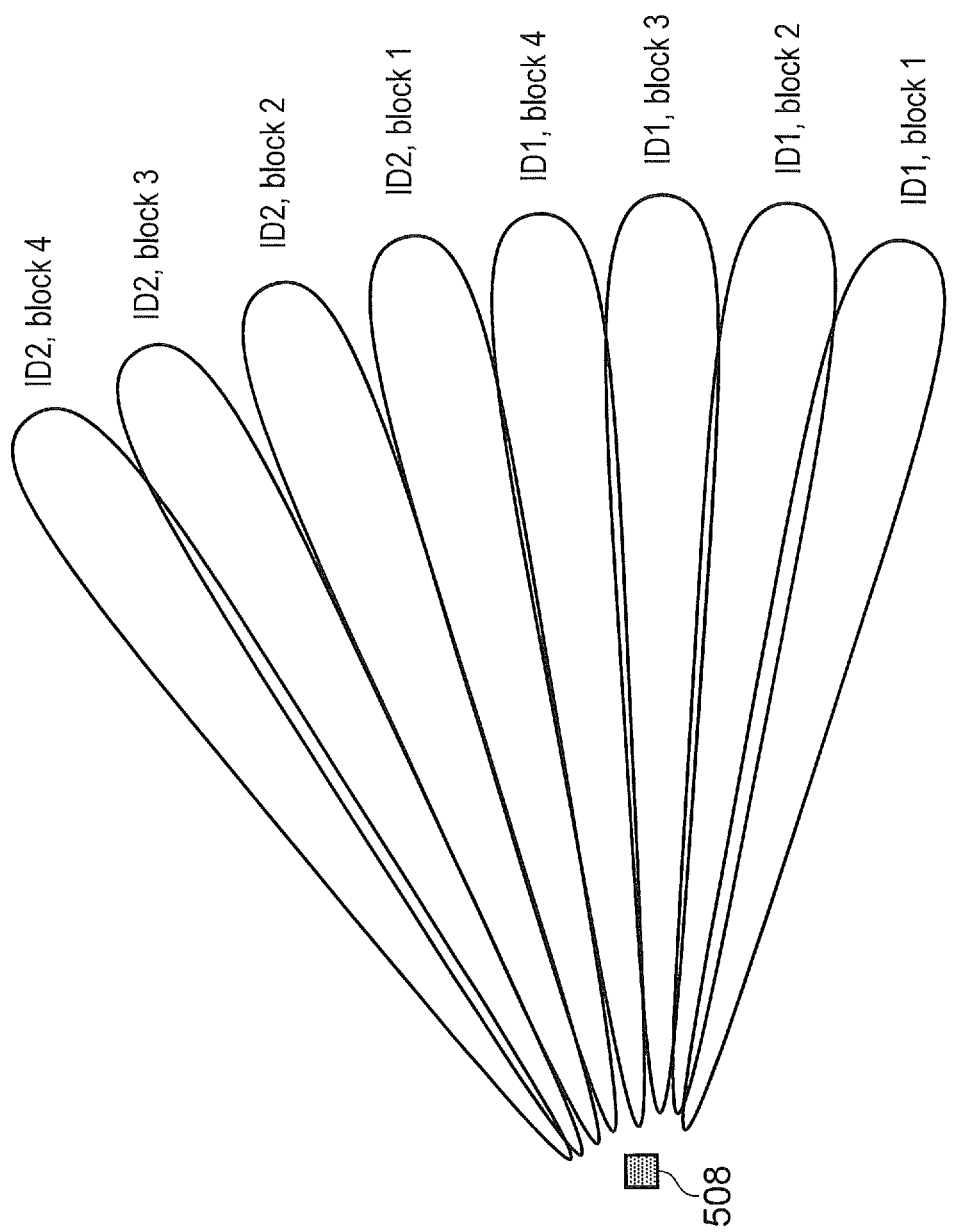
FIGS. 6 and 7 schematically show an example set of beam identities and sweeping blocks during which a beam is active.
Figure 7:
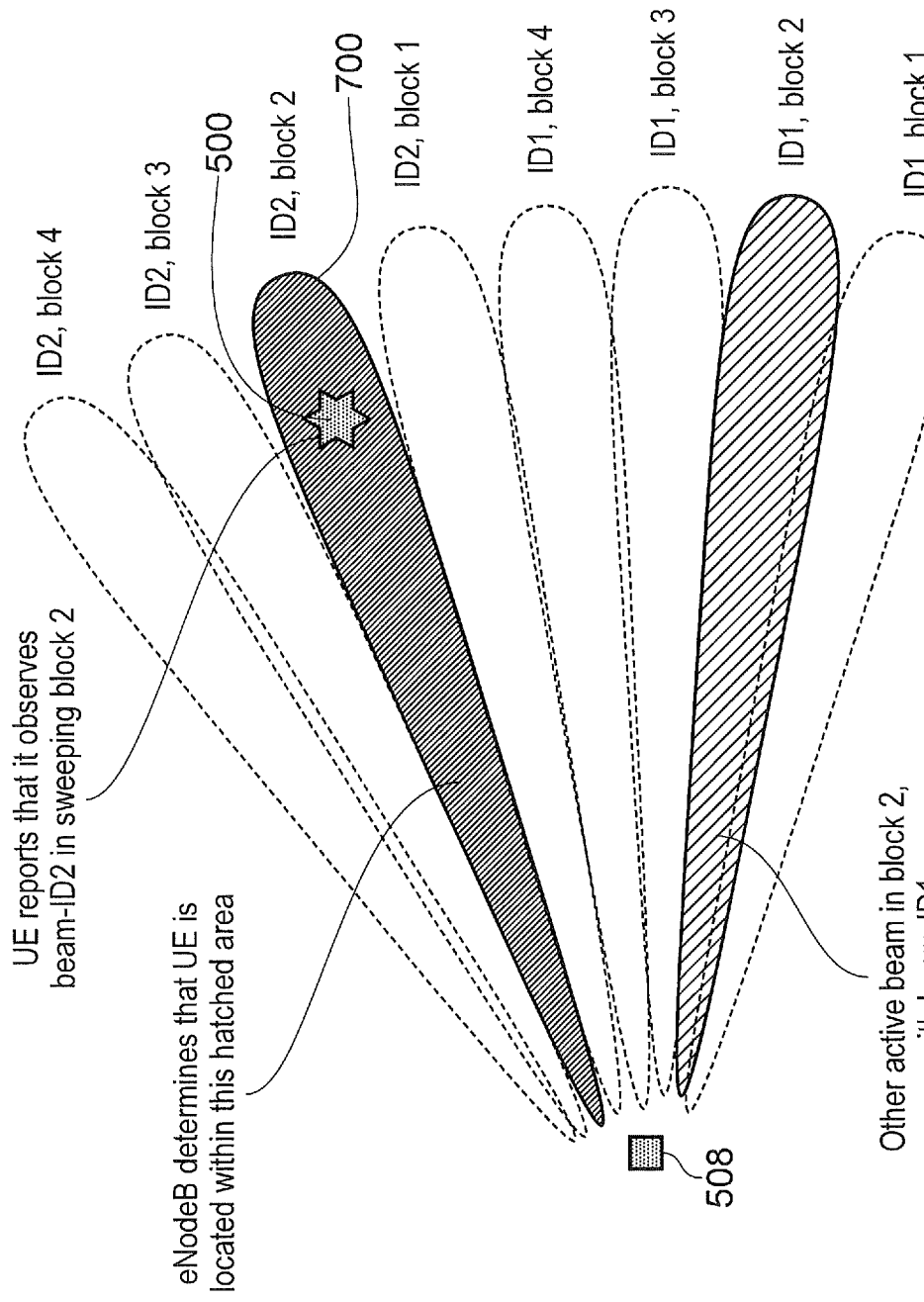

An example set of beam identities and sweeping blocks (corresponding to time) during which a beam is active is shown in FIGS. 6 and 7. Here, each beam is identified by an identifier (either ID1 or ID2) and a first radio signal transmission time (either sweeping block 1, 2, 3 or 4). At any one time (sweeping block), the eNodeB 508 transmits two first radio signals for beams with different beam identities, as shown in FIG. 7. In this figure, it is shown that the beam with beam-ID1 and the beam with beam-ID2 are active in sweeping block 2 (a beam becomes active when the first radio signal for that beam is transmitted so that terminal devices within that beam may receive the first radio signal). When the UE reports to the eNB, using the second radio signal, that is has observed a first radio signal with a certain beam ID at a certain time, the eNB may therefore determine that the UE is located within the beam identified by that beam ID and that time. In the example of FIG. 7, the UE 500 will report, for example, "{beam-ID2, sweeping block 2}", indicating to the eNB that it is positioned in the hatched beam 700.

It will be appreciated that, rather than having different beams differentiated by different first signal transmission times and beam identities, it may be the case that a single or no beam identity is used (in which case the beam within which the UE is located must be determined solely on the basis of the transmission time of the first radio signal) or, alternatively, that a single sweeping block is used (in which case, the first radio signal for all beams is transmitted at the same time, and the beam within which the UE is located must be determined solely on the basis of the beam ID).

More generally, it will be appreciated that a beam identifier may be a parameter whose value is indicative of the beam within which the UE is located at a given time. "ID1" and "ID2" in FIGS. 6 and 7 are each an example of a beam identifier value. This value is indicated by the first radio signal for that beam transmitted by the eNB, and the UE then indicates this value in the second radio signal transmitted back to the eNB. This allows the eNB to determine that the UE is located within the beam associated with this beam identifier value. The first radio signal may indicate the value of the beam identifier as explicit information in the first radio signal, such as in a predetermined field carried on a physical channel used for transmission of the first radio signal within the beam. Alternatively, the first radio signal may indicate the value of the beam identifier in a non-explicit manner, such as on the basis of a scrambling code used for scrambling the first radio signal. In this case, the first radio signal for each beam will be scrambled using a predetermined scrambling code specific to that beam. The eNB then knows the beam within which the UE is located on the basis of which of the predetermined scrambling codes the UE needed to use to successfully descramble the first radio signal (the UE could report an identifier of the successful scrambling code to the eNB using the second radio signal, for example).

Alternatively, or in addition, a parameter indicative of the transmission time of the first radio signal may be a parameter whose value is indicative of the beam within which the UE is located. "block1", "block2", "block3" and "block4" in FIGS. 6 and 7 are each an example of a value of a parameter indicative of the first radio signal transmission time. In this case, the second radio signal indicates the value of the parameter indicative of first radio signal transmission time (as determined by the UE on the basis of the first radio signal), and the eNB is able to determine the beam within which the UE is located on the basis of this value. In one example, the parameter indicative of the first radio signal transmission time is a time position of one or more radio resources in a radio frame used for transmission of the first radio signal, with each beam being associated with one or more radio resources at different respective time positions in the radio frame. The use of different beams being associated with a different subframe or sweeping block index (as exemplified in FIGS. 6 and 7) is an example of such an arrangement.

It will be appreciated that different beams may be associated with different beam identifier values or different first radio signal transmission time values (or both, as in the case of FIGS. 6 and 7) in order for the specific beam within which the UE is located to be determined on the basis of the first and second radio signals.

Figure 8:
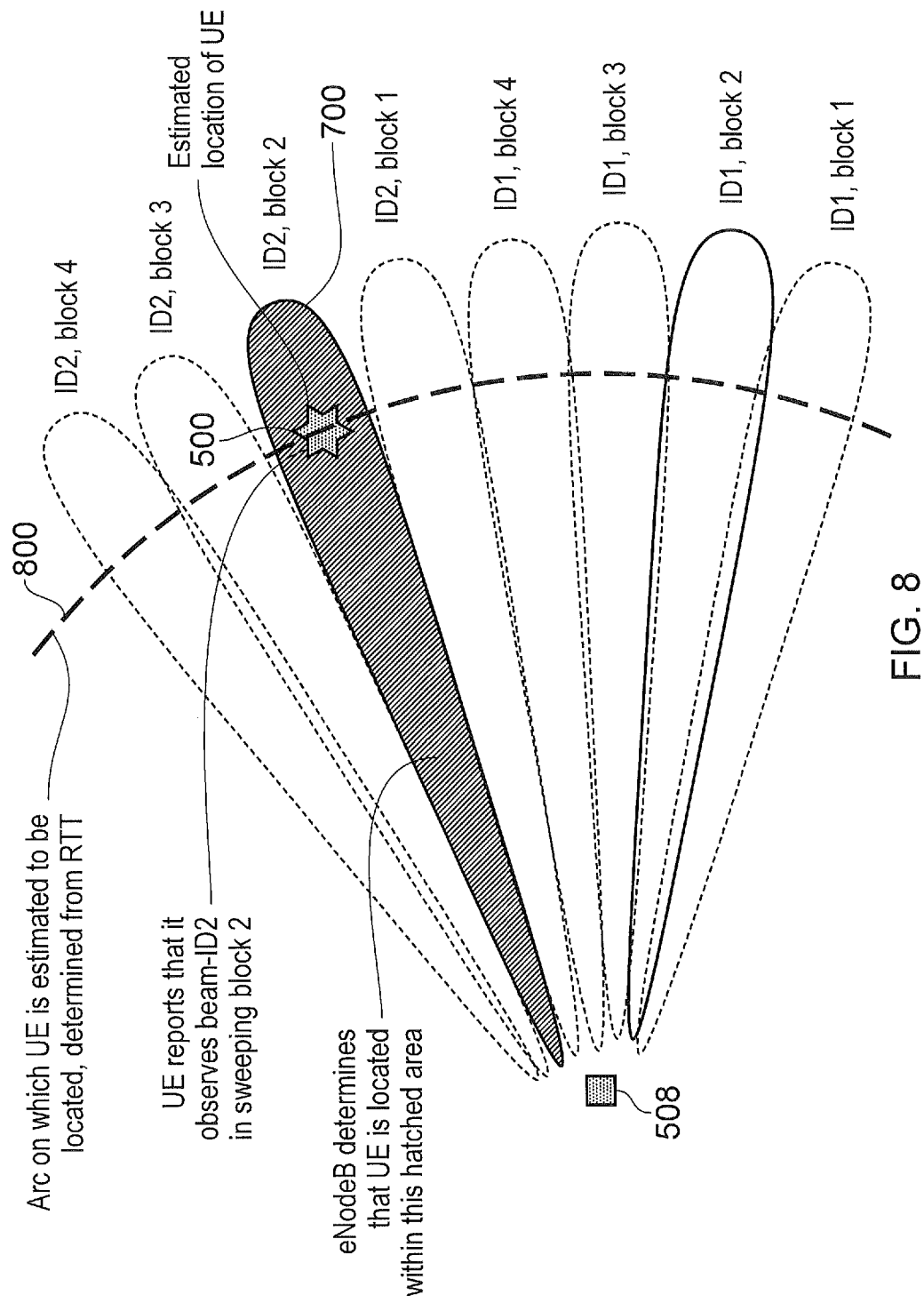
FIG. 8 schematically shows an example of the determination of a terminal device position on the basis of a calculated round trip time.

In a further embodiment, in addition to the UE reporting the identity of the beam and/or the time at which the beam was received, the eNodeB may determine the round trip time, RTT, of a signal between the UE and eNodeB. There are various ways of determining the RTT. One example method of determining the RTT is for the eNodeB to measure the time offset (with respect to the timing of DL signals) of a PRACH (Physical Random Access Channel) preamble received by the eNodeB. The timing offset is related to the RTT (which is a function of the distance between the eNodeB and UE). Determination of the UE position according to this embodiment is shown in FIG. 8. FIG. 8 has the same beams as shown in FIGS. 6 and 7. However, this time, because of the calculation of the RTT (which allows an approximate distance between the eNB and UE to be calculated), it can be determined not only that the UE is within the beam 700, but also that the UE must be located somewhere on the arc 800 within the beam 700. A more accurate position of the UE can therefore be determined. It is noted that even if, in some embodiments, there is an uncertainty in the RTT determination, the use of the RTT in the way described still allows the UE position to be estimated to be within a region in the vicinity of the arc 800, thus still allowing the position of the UE to be estimated more accurately than when only the beam within which the UE is located is determined.

In one embodiment, the UE reports parameter values such as beam-IDs and the sweeping blocks during which those beam-IDs were received on multiple eNodeBs (or, in general, multiple Transmission and Reception Points (TRPs) of the network). The transmissions from the different TRPs may be distinguished by being transmitted on, for example:
  different frequencies (e.g. when the eNodeB use different carrier frequencies)—these can be considered to be inter-frequency measurements
  different component carriers
  different subcarriers of the same component carriers same carrier frequency, but with different cell-IDs, or different beam-IDs same carrier frequency, but using different subframes (e.g. eNodeB1 uses subframe 'n', divided into sweeping blocks and eNodeB2 uses subframe 'n+1', divided into sweeping blocks)

In general, the UE does not need to be aware that it is measuring first radio signals for beams from different eNodeBs. Rather, the UE just needs to be configured to detect the first radio signals for each of the beams within which it is located and to report the relevant one or more parameter values (such as times and/or beam IDs) for each of those different beams to its serving eNBs. This report could be transmitted to the UE's serving eNB using a single second radio signal once the parameters for each beam have been determined. Alternatively, the report associated with the beam of the serving eNB could be transmitted to the serving eNB using the second radio signal, whilst the reports associated with the beams of other eNBs could be transmitted to the serving eNB using one or more third radio signals.

Figure 9:
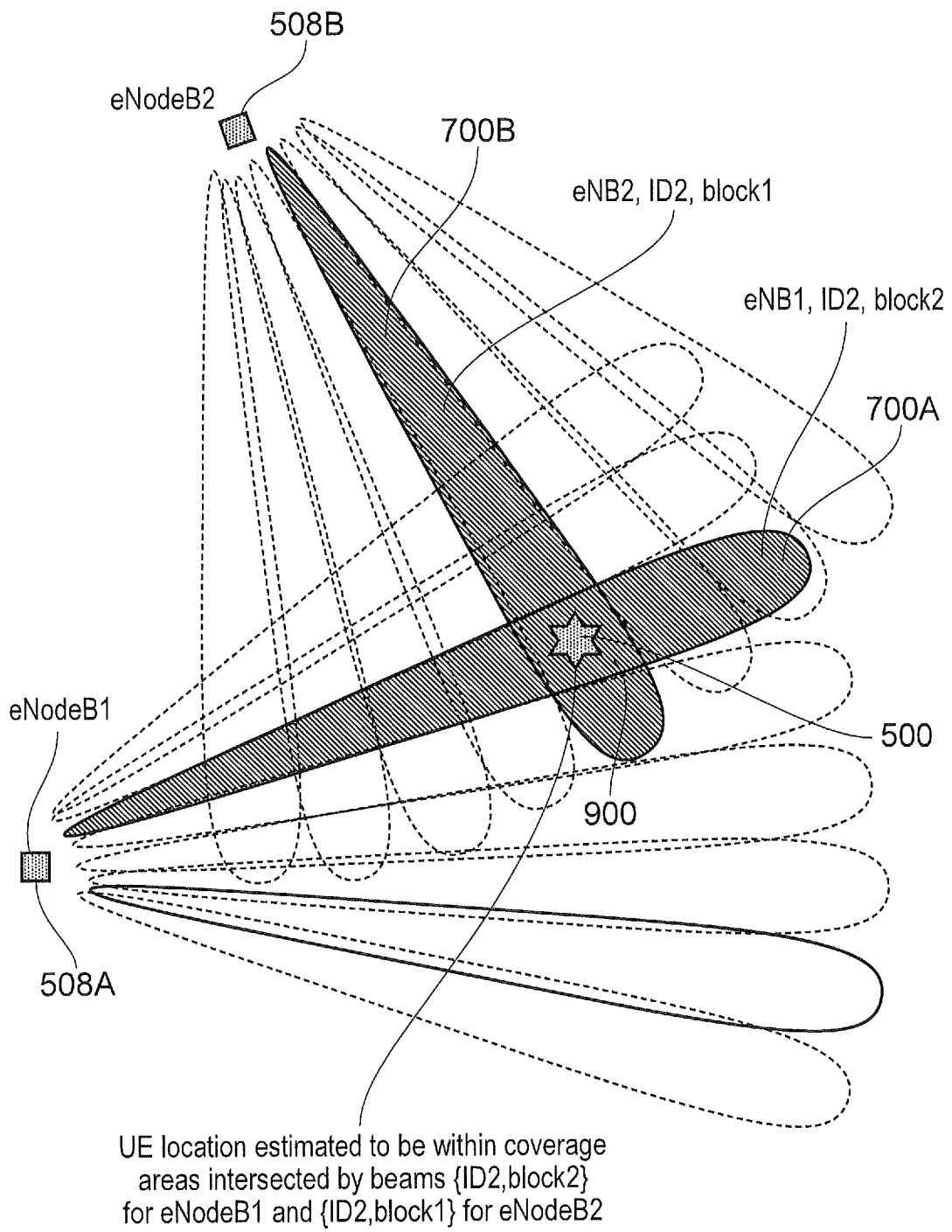
FIG. 9 schematically shows an example of the determination of a terminal device position on the basis of an intersecting region of a plurality of beams.

Operation of this embodiment is illustrated in FIG. 9. Here, it can be seen that the UE 500 is simultaneously located within two beams, a first beam 700A associated with a first eNB 508A and a second beam 700B associated with a second eNB 508B (note that both eNBs are functionally identical to the eNB 508 shown in FIG. 5B). More specifically, the UE 500 is located within an intersecting region 900 of the two beams 700A and 700B. As long as each beam remains uniquely identifiable by the UE on the basis of the parameter values (such as beam ID and/or time) associated with that beam, the location of the UE can be determined as being within the intersecting region 900. This allows a more accurate determination of the location of the UE compared to when the UE is located within only a single beam.

In the example of FIG. 9, the UE 500 reports that it has detected the parameter values {beam-ID2,sweeping block2} on the basis of a first radio signal received from the first eNB 508A and that it has detected the parameter values {beam-ID2,sweeping block1} on the basis of a first radio signal received from the second eNB 508B. On the basis of this information, the eNB 508A or 508B currently serving the UE determines that the UE is located within both beam 700A and beam 700B, and must therefore be within the intersecting region 900.

In the case that, for each beam, the time of the sweeping block used for transmission of the first radio signal is used as a first radio signal transmission time parameter, the UE can report this parameter using the second radio signal in various ways.

In one example, the UE explicitly reports the sweeping block in which each first radio signal is visible. For example, the UE may send, as a second radio signal, an RRC message that explicitly identifies the sweeping block with which each first radio signal is detected.

In another example, the UE sends the second radio signal a predetermined time period after receipt of the first radio signal. For example, the UE may send the second radio signal (in the form of a preamble or sounding reference signal, for example) a known number of time units (for example, a known number of subframes or sweeping blocks) after the UE detects the first radio signal. When the UE detects first radio signals in multiple cells simultaneously, then, for each of those cells, it may send a radio signal (such as a preamble or SRS) that is specific to that cell. Alternatively, the UE may send a single second radio signal (such as a single preamble or single SRS) that is valid for that UE for all the cells from which a first radio signal was received.

Figure 10:
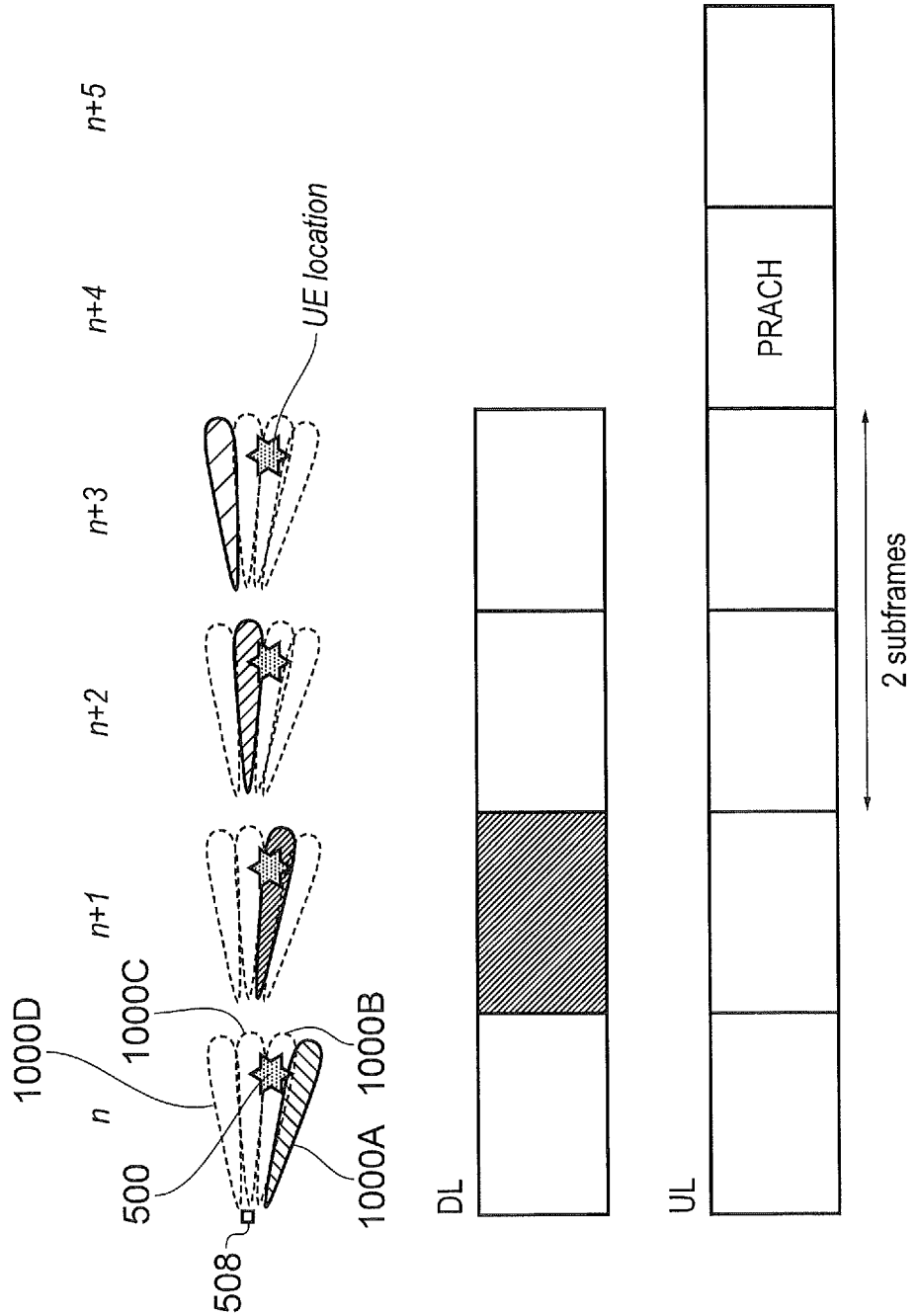
FIG. 10 schematically shows an example in which a terminal device sends, as a second radio signal, a PRACH preamble a predetermined number of subframes after detection of a first radio signal.

In one example, when sending a preamble as the second radio signal, the UE may send a PRACH preamble to the network. The network can assign a PRACH preamble to the UE for positioning purposes (which can be assigned to the UE for the duration of the time that the UE is required to make positioning estimates). This is illustrated in FIG. 10, where the UE sends a PRACH preamble two subframes after detection of the first radio signal. In this figure, the UE is shown to be located within the beam that is active during subframe 'n+1'. The UE detects this beam (on the basis of the first radio signal associated with this beam) and sends a PRACH preamble in subframe 'n+4'. Since there is a known timing relationship between beam detection and PRACH preamble transmission (in this figure, the timing relationship is 2 full subframes between the end of the beam detection subframe and the start of the PRACH preamble transmission subframe), the network can determine that the UE detected the beam in subframe 'n+1' and is hence located within the beam which is active at subframe 'n+1'. It is noted that the eNB can also determine the RTT from this said PRACH preamble, which can be used to further improve the accuracy of the UE's positioning (as previously described).

FIG. 10 shows a time offset of two blank subframes between detection of a beam (that is, detection of the first radio signal associated with a beam) and transmission of a PRACH preamble. The duration of this time offset may be determined based on factors such as the width of the beam and the UE receiver characteristics (this duration may be specified or configured by the network, for example). First radio signals received for different beams may show some angular spread and may be received at different power levels in different subframes/sweeping blocks. The time offset allows the UE to determine the largest received first radio signal level within the time offset and then send the preamble (this being the second radio signal, in this example) at a time relative to that largest received signal level.

For example, referring to FIG. 10 (in which the UE is located within beam 1000B), if the UE receives a first radio signal with a power of 0.5 P in subframe n (relating to beam 1000A), a power P in subframe n+1 (relating to beam 1000B) and a power 0.25 P in subframe n+2 (relating to beam 1000C), then:

At subframe n, in response to receipt of the first radio signal corresponding to beam 1000A, the UE schedules transmission of the preamble in subframe n+3

At subframe n+1, the UE receives the first radio signal corresponding to beam 1000B, which has a higher relative power level. The UE thus un-schedules the preamble transmission in subframe n+3, and schedules a new preamble transmission in subframe n+4.

At subframe n+2, the UE receives the first radio signal corresponding to beam 1000C, which has a lower relative power level. The UE therefore does not alter its previously determined preamble transmission schedule.

In this manner, the time offset allows the UE to report the time at which the maximum power is received for a succession of first radio signals. The beam within which the UE is located may therefore be determined even in the case that the UE is able to receive first radio signals associated with other beams.

As has already been noted, the network can use the above-mentioned embodiment in conjunction with the use of RTT in order to determine the distance from the eNodeB to the UE. More specifically, in this case, the receipt of the second radio signal (in the form of the PRACH preamble, for example) allows the eNodeB to determine within which beam the UE resides (determined from the subframe within which the PRACH preamble is received). The distance between the UE and the eNodeB can then be determined based on the RTT, the RTT being calculated based on the timing of the reception of the PRACH within the subframe). This allows a more accurate approximation of the UE location.

It will be understood that when direction of the first radio signal is changed such that the position of a particular beam is changed ("swept") with a time periodicity of less than a subframe (for example, with the periodicity of a "sweeping block", as referred to above), the timing of the UL second radio signal transmission may be more granular than a subframe (for example, the second radio signal can be sent at a smaller level of granularity within an uplink subframe). Alternatively, for example, the UE can be assigned several UL preambles and both the preamble sequence and the subframe in which it is transmitted (as the second radio signal) can be a function of the sweeping block in which the beam is detected.

The assignment of multiple preambles to the UE can also be used to signal both a beam-ID and a first radio signal detection time (for example, sweeping block) to the network. For example, the preamble sequence transmitted may be related to the beam-ID observed and the timing of the preamble transmission may be related to the sweeping block in which the beam is detected.

In an embodiment, the eNodeB performs beamforming in both the DL and the UL, where the sweep pattern of the UL beamforming is delayed relative to the sweeping pattern of the DL beamforming. Referring to FIG. 10, this allows a response from the UE to be received using beamforming, where the response from the UE is delayed relative to the downlink beamformed transmission from the eNodeB.

To be clear, with the present technique, beamforming in the DL should be understood to include the eNB transmitting the first radio signal over the predetermined geographical region defined for a particular beam. Similarly, beamforming in the UL should be understood to include the eNB listening for the second radio signal over the predetermined geographical region defined for a particular beam. Each beam is thus, in essence, defined by a predetermined geographical region within which a first radio signal (which is generated by an eNB and which indicates one or more parameter values indicative of the predetermined geographical region) and a second radio signal (which is generated by a UE on the basis of the one or more parameter values as determined by the UE on the basis of the first radio signal) may be exchanged between a UE and an eNB. "Sweeping" of a beam refers to a change from first radio signal being transmitted over one beam to a first radio signal being transmitted over another beam. In other words, "sweeping" occurs as the active beam of a plurality of beams is changed over time. The active beam is changed by changing the direction in which the first radio signal is beamformed. It will be appreciated that the parameter values indicated by the first radio signal will also be changed as the beam is "swept" (since each "sweep" results in a different beam with different parameter values being activated). It is also noted that, when discussing the transmission of a beam, what is actually being discussed is the transmission of a signal (such as the first radio signal) by the eNB over the predetermined geographical region which defines the beam.

In another embodiment, the UL transmissions from the UE are delayed relative to the DL beamformed transmissions from the eNodeB by a multiple of the time it takes to cycle through the whole set of beams. For example if the eNodeB cycles through 4 beams, in 4 different subframes, then the UE responds to a DL transmission in subframe 'n' using subframe 'n+4'. This has the advantage of allowing the eNodeB to synchronise operation of beamforming in the UL and the DL, while still allowing the UE sufficient time to process the DL signals.

Figure 11A:
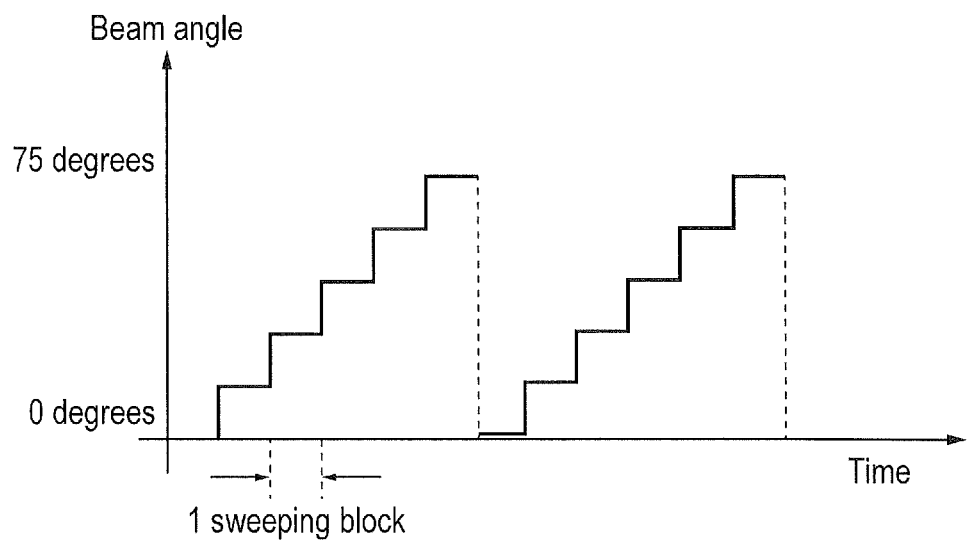
FIGS. 11A and 11B show schematically illustrate, respectively, a discrete and continuous beam sweeping arrangement.

In one embodiment, the eNodeB sweeps the beam in a fixed number of steps. This is exemplified in FIG. 11A, where the beam is swept in 6 steps across a 90 degree range, with each step occupying a single sweeping block. Here, each sweeping block corresponds to a discrete, different beam direction. In this case, the UE can perform measurements over the entire sweeping block in order to detect the beam and report the sweeping block in which the beam is detected.

In another embodiment, the eNodeB sweeps the beam in a continuous fashion. This is exemplified in FIG. 11B. In this case, the UE can report the timing at which the beam is received with the strongest signal strength (that is, when the UE detects a local maximum in the transmission power of the beam). This allows the timing to be reported with a granularity of less than that of the duration of the sweeping block. This allows the system to determine the angular location of the UE with greater accuracy (that is, with sub-sweeping block granularity).

Figure 12:
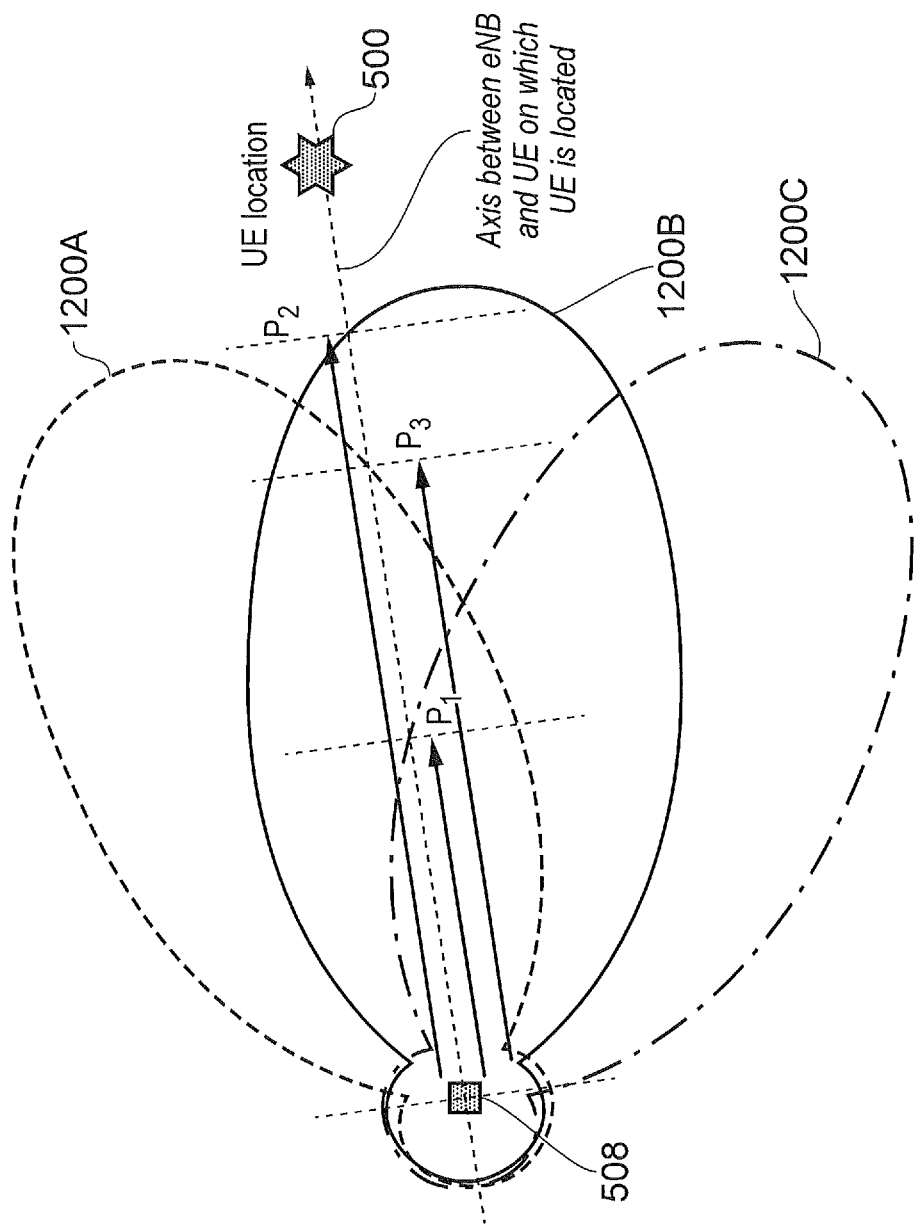
FIG. 12 schematically shows an example arrangement in which a terminal device may receive radio signals from an infrastructure equipment for more than one beam.

In an embodiment, the geographical coverage area of each beam (as determined by the radiation pattern of the first radio signal, for example) has a rounded shape, as illustrated in FIG. 4. Hence, the UE may receive power from the beam (as the eNB transmits the first radio signal associated with each beam) when it is in more than one of the sweeping blocks, as shown in FIG. 12. This figure shows the eNodeB sweeping through three beams 1200A, 1200B and 1200C in three successive sweeping blocks. The figure shows that the power received by the UE 500 in the three sweeping blocks varies. Since the power received for beam 1200B (P2) is the greatest, the network can determine that the UE is located within the beam 1200B. Also, since the power received in beam 1200A (P3) is greater than the power received in beam 1200C (P1), the network can determine that the UE is located on the anticlockwise-rotated side of the beam 1200B. Hence, in an embodiment, the UE reports not only the beam that it detects with the greatest power, but also the power levels of the beams in adjacent sweeping blocks. This embodiment allows the eNB 508 to obtain a more accurate estimate of the location of the UE. In this embodiment, the UE can report the differing power levels in one of several different ways. For example:

The UE can report the received power level of the first radio signal of each beam that it detects.

The UE can report the identity of the beam for which the first radio signal is detected with maximum reliability, together with the relative power of the first radio signals of the adjacent beams.

The eNodeB can send numerical weighting factors for each of the beams as a configuration message to the UE. The UE then calculates a value based on the weighting factors and the received power levels of the first radio signals of the beams and reports the calculated value to the eNB as a fractional beam identity. The fractional beam identity is a numerical value which indicates both the beam within which the UE is located and the nearest adjacent beam to the UE based on the adjacent beam power. For example, in FIG. 12, the eNB may associate a weighting factor of 1 to beam 1200C, a weighting factor of 2 to beam 1200B and a weighting factor of 3 to beam 1200A. Since the power level from the beam 1200A is higher than the power level of beam 1200C, the UE thus reports a fractional beam location of "2.5" (indicative of the UE being located within beam 1200B with weighting factor 2 but in the direction of beam 1200A with weighting factor 3).

Figure 13:
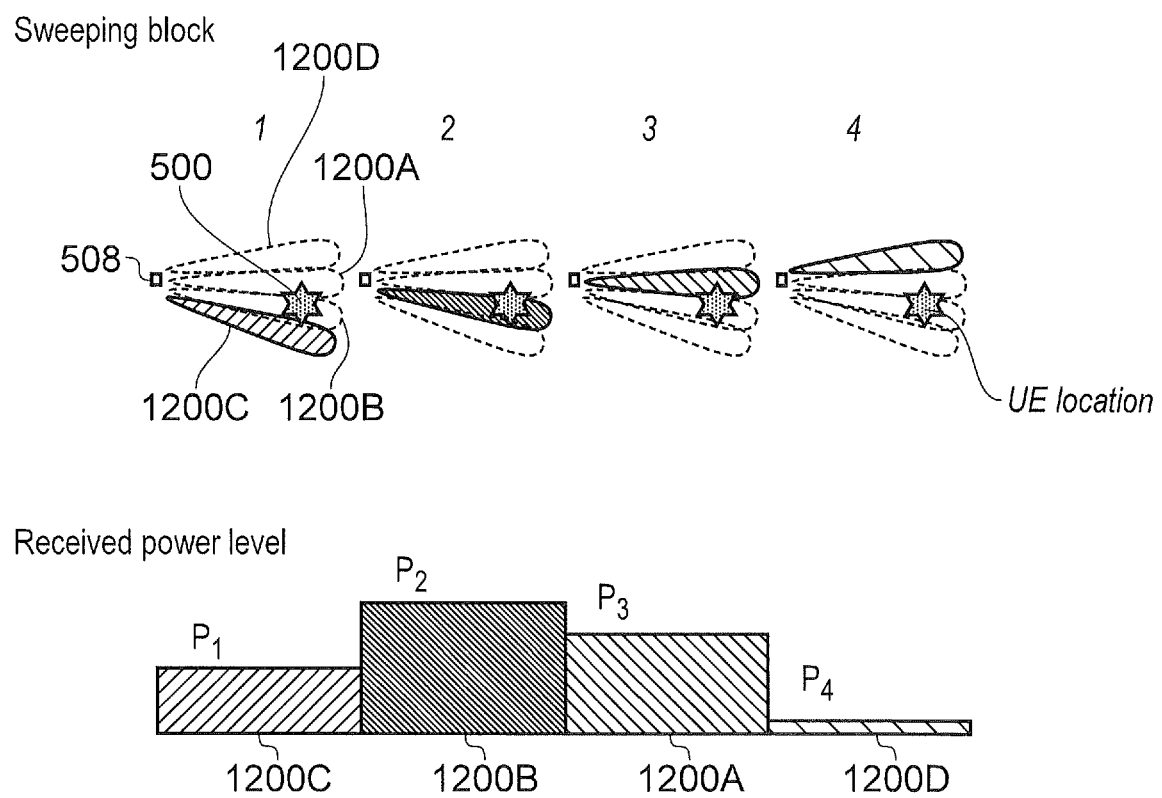
FIG. 13 schematically shows the relative power of the radio signals received by the terminal device for each of the beams in FIG. 12.

The relative power levels received by the UE for each of the beams shown in FIG. 12 are shown in FIG. 13. FIG. 13 also includes the power level of a further beam 1200D (P4). Again, it can be seen that, based on the relative power levels, the eNB can determine not only that the UE is within the beam 1200B, but that the UE is closer to the beam 1200A than to the beam 1200C. A more accurate approximation of the UE location can therefore be found.

Figure 11B:
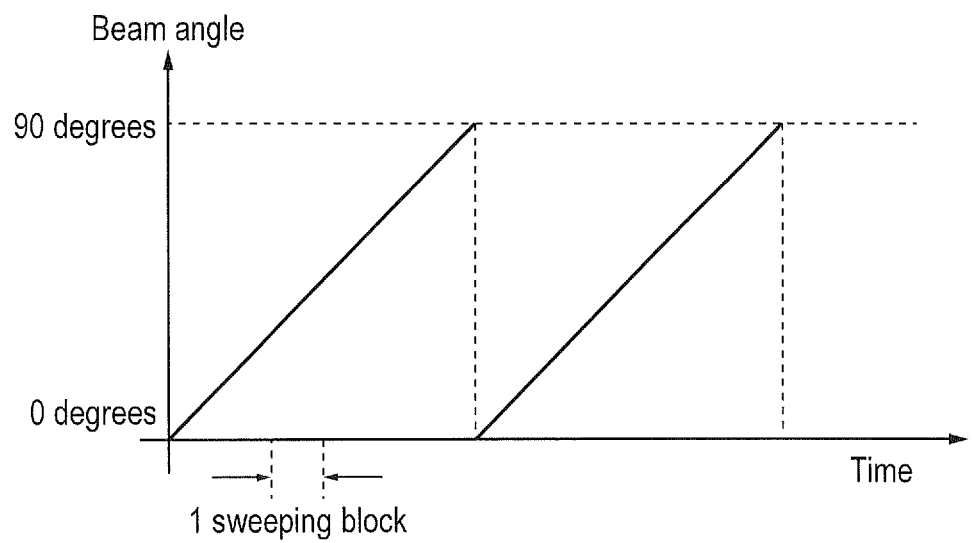
Figure 14:
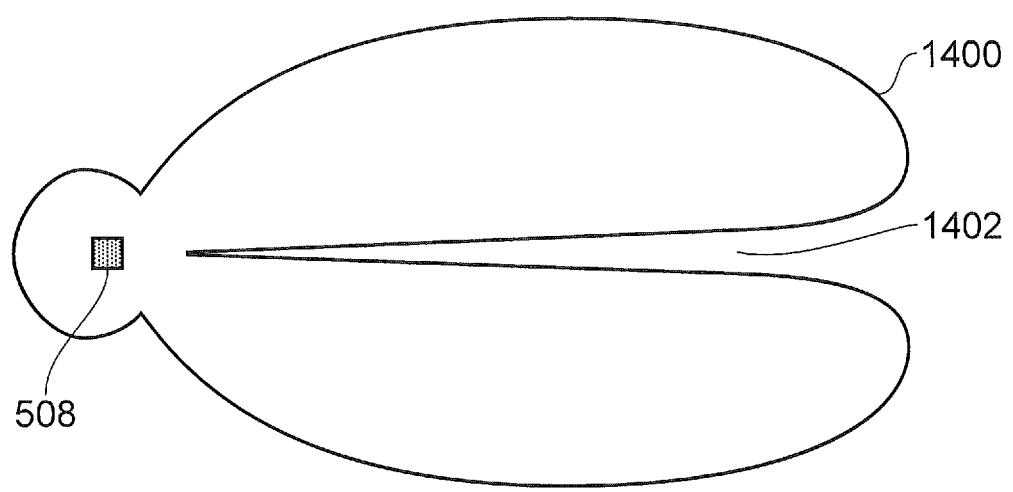
FIG. 14 schematically shows a radiation transmission pattern for a beam comprising a notch.

As shown in FIG. 14, in an embodiment, for the continuous beam sweeping case shown in FIG. 11B, the eNodeB 508 transmits a beam radiation pattern 1400 with a notch 1402 in the radiation pattern, and the UE reports the time at which it observes the notch (that is, the time at which the UE observes a minimum in received power, preceded and succeeded by a higher received power levels—in other words, the time at which the UE detects a local minimum in the beam transmission power). It is known that it is possible to create a sharper notch in a radiation pattern than it is to define a narrow transmitted beam. Hence this embodiment allows a more accurate UE location to be determined.

Figure 15A:
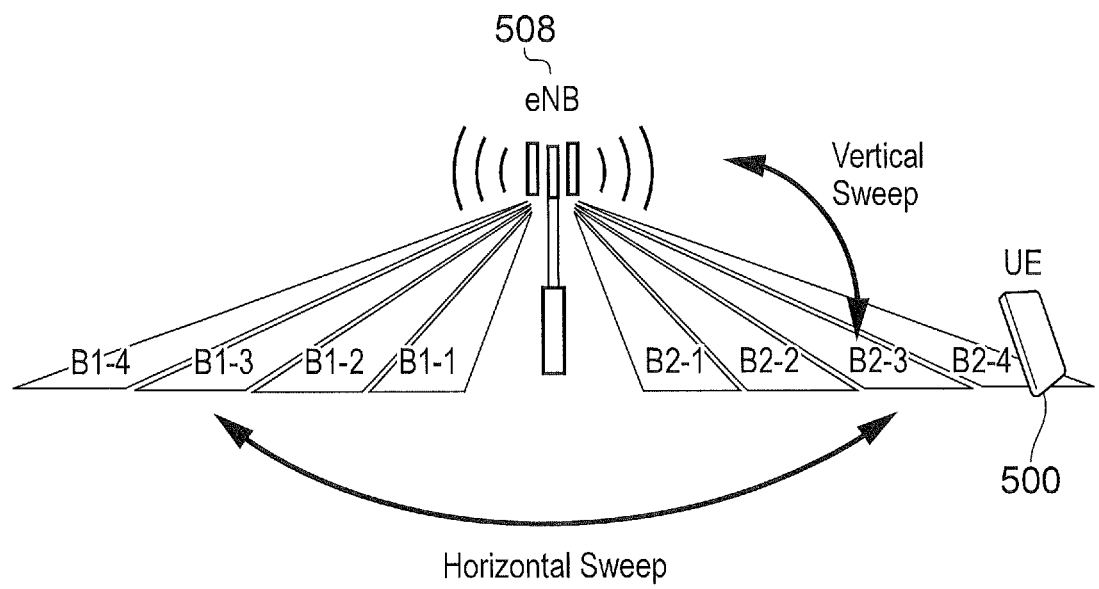
FIGS. 15A and 15B schematically illustrate a three dimensional (3D) beam distribution pattern.
Figure 15B:
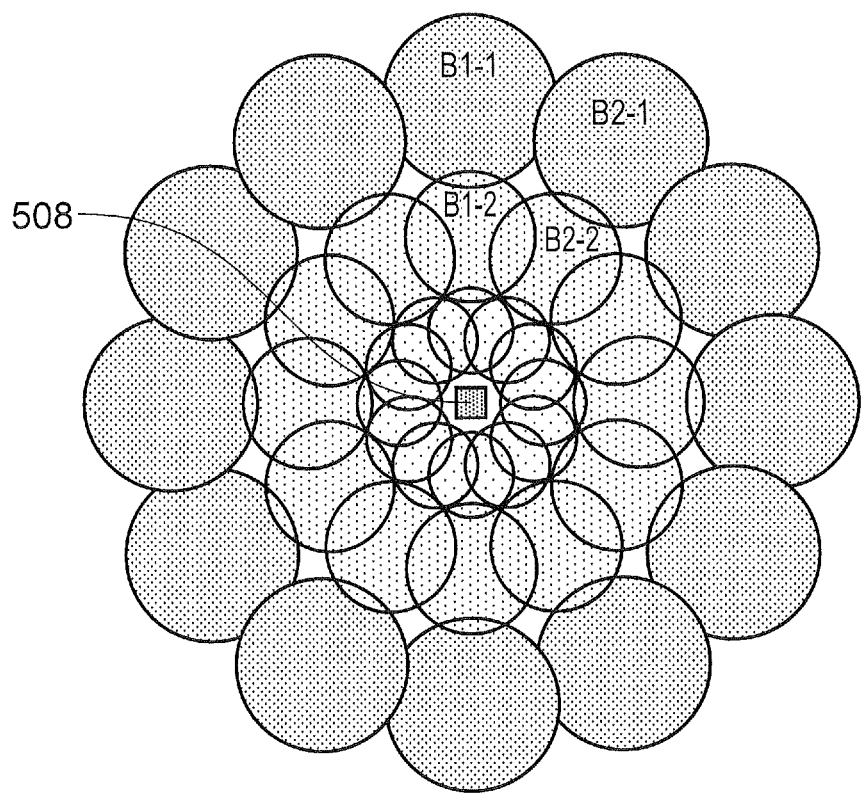

In addition to a horizontal sweep of the beam, it is also possible to have a vertical sweep of the beam and this provides a 3D map of the cell as shown in FIGS. 15A and 15B. Here, it is shown that the beam can be swept in a horizontal manner and also in a vertical manner. In this example, each beam is identified by a beam ID comprising a horizontal beam ID and a vertical beam ID. Such a beam ID may take the form Bx-y, for example, where x is the horizontal beam ID and y is the vertical beam ID. In the example of FIG. 15A, the UE 500 will detect beam B2-4 (horizontal beam 2 and vertical beam 4) on the basis of the first radio signal transmitted for this beam and will report this to the eNB 508. The network is aware of the height of the eNB and the vertical angle of the beam and hence is able calculate the location of the UE within its coverage. This calculation may be carried out by the eNB 508 itself or by any other suitable network infrastructure equipment (as is the case with all network side calculations or determinations as described in the embodiments).

FIG. 15B shows an example beam pattern that is produced by the vertical and horizontal beam sweeping shown in FIG. 15A. If the UE reports the identity of the beam that it receives (or the beam-ID and the time at which it is received, or any other suitable parameter values which allow the beam within which the UE is located to be uniquely identified), the UE location can be determined with the accuracy of the beam footprints shown in FIG. 15B.

The embodiments described above relate to cases where the UE reports information on beams that it observes, sends these reports to the network and the network determines the location of the UE. It is, however, envisaged (see [7], for example) that the beam itself can indicate (as part of the beam identifier of the first radio signal, for example) the geographical coverage area of the beam. Thus, in another embodiment, the UE is able to determine the geographical coverage area of the beam within which it is located on the basis of this indication. The second radio signal in this case will thus indicate the geographical coverage area of the beam within which the UE is located. Furthermore, when the UE receives multiple such beams, it can itself determine its location by calculating the intersecting region of these beams. It may then either send this location to the network (using the second radio signal) or use the determined location for implementation specific purposes (for example, for presentation to a user). In an alternative embodiment, the UE sends a report to the network of the geographic coverage areas of the beams for which a first radio signal was received, and the network determines the location of the UE based on these reports.

Figure 16:
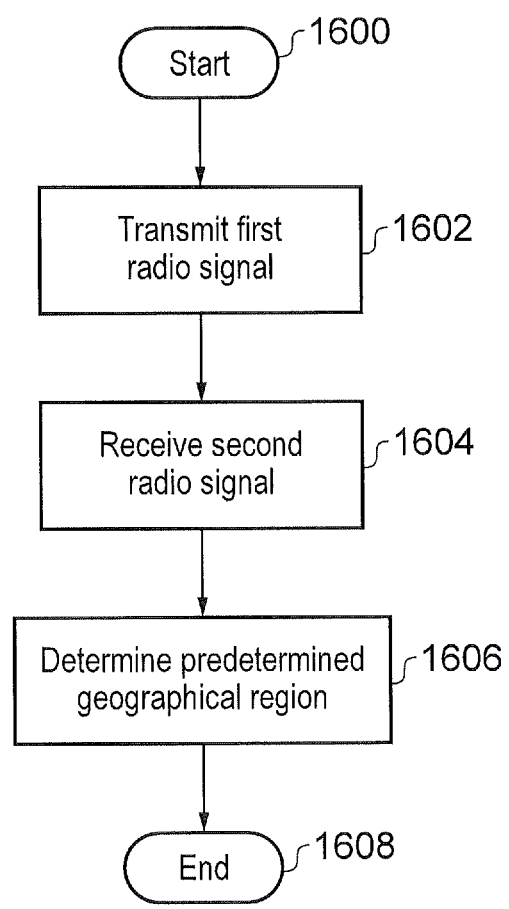
FIG. 16 shows a flow chart schematically illustrating a process carried out by infrastructure equipment according to an embodiment.

FIG. 16 shows a flow chart schematically illustrating a process carried out by eNB 508 according to an embodiment of the present technique. The process starts at step 1600. At step 1602, the transmitter 510 transmits a first radio signal to a terminal device (such as UE 500) located within one of a plurality of predetermined geographical regions, wherein the value of one or more predetermined parameters indicative of the one of the plurality of predetermined geographical regions within which the terminal device is located is determinable by the terminal device on the basis of the first radio signal, each of the plurality of predetermined geographical regions being associated with a different respective value of the one or more predetermined parameters which is indicative of that predetermined geographical region. At step 1604, the receiver 512 receives a second radio signal from the terminal device located within the one of the plurality of predetermined geographical regions, the second radio signal being generated by the terminal device on the basis of the value of the one or more predetermined parameters indicative of the one of the plurality of predetermined geographical regions, the value of the one or more predetermined parameters being determined by the terminal device on the basis of the first radio signal. At step 1606, the controller 514 determines the one of the plurality of predetermined geographical regions within which the terminal device is located on the basis of the second radio signal. The process then ends at step 1608. It will be appreciated that, in another embodiment, the second radio signal could be forwarded from the eNB 508 to a location server (not shown) so as to allow the location server to then determines the one of the plurality of predetermined geographical regions within which the terminal device is located on the basis of the second radio signal. In this case, a controller (not shown) of the location server will perform the same processing as the controller 514 as described in step 1606. It will be appreciated that, in this case, the combination of the eNB 508 and location server form infrastructure equipment according to the present technique.

Figure 17:
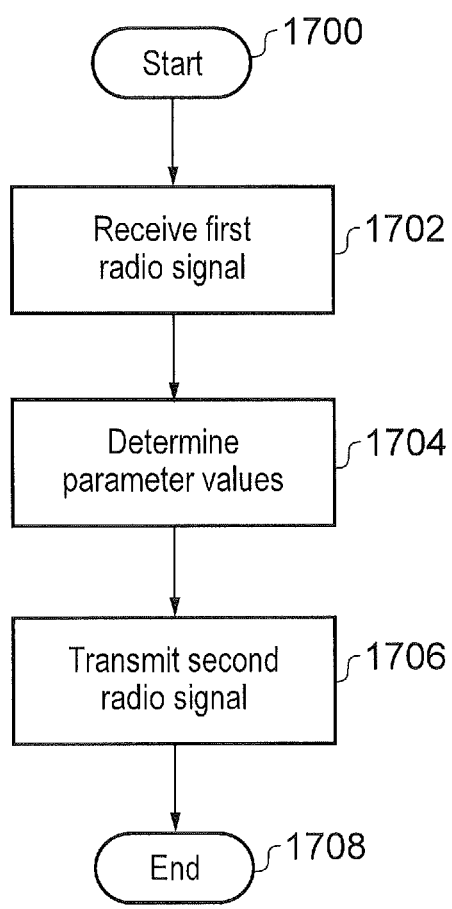
FIG. 17 shows a flow chart schematically illustrating a process carried out by terminal device according to an embodiment.

FIG. 17 shows a flow chart schematically illustrating a process carried out by UE 500 according to an embodiment of the present technique. The process starts at step 1700. At step 1702, the receiver 504 receives, when the UE 500 is located within one of a plurality of predetermined geographical regions, a first radio signal from infrastructure equipment (such as eNB 508). At step 1704, the controller 506 determines, on the basis of the first radio signal, the value of one or more predetermined parameters indicative of the one of the plurality of predetermined geographical regions within which the UE 500 is located, each of the plurality of predetermined geographical regions being associated with a different respective value of the one or more predetermined parameters which is indicative of that predetermined geographical region. At step 1706, the transmitter 502 transmits a second radio signal to the infrastructure equipment, the second radio signal being generated by the controller on the basis of the value of the one or more predetermined parameters indicative of the one of the plurality of predetermined geographical regions within which the UE 500 is located, wherein the one of the plurality of predetermined geographical regions within which the UE 500 is located is determinable by the infrastructure equipment on the basis of the second radio signal. The process then ends at step 1708.

Various features of embodiments of the present technique are described by the following numbered clauses:

1. Infrastructure equipment for use with a wireless telecommunications system, the infrastructure equipment comprising:

a transmitter operable to transmit a first radio signal to a terminal device located within one of a plurality of predetermined geographical regions, wherein the value of one or more predetermined parameters indicative of the one of the plurality of predetermined geographical regions within which the terminal device is located is determinable by the terminal device on the basis of the first radio signal, each of the plurality of predetermined geographical regions being associated with a different respective value of the one or more predetermined parameters which is indicative of that predetermined geographical region;

a receiver operable to receive a second radio signal from the terminal device located within the one of the plurality of predetermined geographical regions, the second radio signal being generated by the terminal device on the basis of the value of the one or more predetermined parameters indicative of the one of the plurality of predetermined geographical regions, the value of the one or more predetermined parameters being determined by the terminal device on the basis of the first radio signal; and a controller operable to determine the one of the plurality of predetermined geographical regions within which the terminal device is located on the basis of the second radio signal.

2. Infrastructure equipment according to clause 1, wherein:

the one or more predetermined parameters of which a value is indicative of the one of the plurality of predetermined geographical regions within which the terminal device is located include a predetermined geographical region identifier;

the first radio signal indicates a predetermined geographical region identifier value indicative of the one of the plurality of predetermined geographical regions within which the terminal device is located; and the second radio signal indicates the predetermined geographical region identifier value indicated by the first radio signal.

3. Infrastructure equipment according to clause 2, wherein the first radio signal indicates the predetermined geographical region identifier value as explicit information in the first radio signal.

4. Infrastructure equipment according to clause 2, wherein the first radio signal indicates the predetermined geographical region identifier value on the basis of a scrambling code used for scrambling the first radio signal.

5. Infrastructure equipment according to any preceding clause, wherein:

the one or more predetermined parameters of which a value is indicative of the one of the plurality of predetermined geographical regions within which the terminal device is located includes a parameter indicative of a time at which the first radio signal is transmitted between the transceiver and the terminal device; and the second radio signal indicates the value of the parameter indicative of the time at which the first radio signal is transmitted between the transceiver and the terminal device.

6. Infrastructure equipment according to clause 5, wherein:

the parameter indicative of the time at which the first radio signal is transmitted between the transceiver and the terminal device is a time position of one or more radio resources in a radio frame used for transmission of the first radio signal between the transceiver and the terminal device, each of the plurality of predetermined geographical regions being associated with one or more radio resources at different respective time positions in the radio frame.

7. Infrastructure equipment according to clause 6, wherein the second radio signal comprises an identifier of the one or more radio resources used for transmission of the first radio signal between the transceiver and the terminal device, and the controller is operable to determine the one of the plurality of predetermined geographical locations within which the terminal device is located on the basis of the one or more radio resources identified by the second radio signal.

8. Infrastructure equipment according to clause 6, wherein the controller is operable to determine the one of the plurality of predetermined geographical locations within which the terminal device is located on the basis of a time position of one or more radio resources in the radio frame used for transmission of the second radio signal between the terminal device and the transceiver, the time position of the one or more radio resources in the radio frame used for transmission of the second radio signal between the terminal device and the transceiver and the time position of the one or more radio resources in the radio frame used for transmission of the first radio signal between the transceiver and the terminal device being separated by a predetermined time period.

9. Infrastructure equipment according to any one of clauses 6 to 8, wherein:

the first radio signal is transmitted in a continuously varying direction over a time period occupied by the one or more radio resources in the radio frame used for transmission of the first radio signal between the transceiver and the first terminal device, and the second radio signal indicates a time during the time period occupied by the one or more radio resources in the radio frame used for transmission of the first radio signal at which a predetermined event associated with the first radio signal is detected by the terminal device; and the controller is operable to determine a position of the terminal device within the one of the plurality of predetermined geographical regions within which the terminal device is located on the basis of the time indicated by the second radio signal.

10. Infrastructure equipment according to clause 9, wherein the predetermined event associated with the first radio signal is the detection of a local maximum reception power by the terminal device.

11. Infrastructure equipment according to clause 9, wherein:

the transceiver is operable to transmit the first radio signal over the one of the plurality of geographical areas within which the terminal device is located using a radiation pattern comprising a notch; and the predetermined event associated with the first radio signal is the detection of a local minimum reception power by the terminal device, the local minimum reception power being indicative of the presence of the notch in the radiation pattern.

12. Infrastructure equipment according to any one of clauses 5 to 8, wherein:
    the second radio signal is indicative of a reception power of the first radio signal as detected by the terminal device;
    the transceiver is operable to
    transmit a preceding radio signal over a first one of the plurality of predetermined geographical regions other than the one of the plurality of predetermined geographical regions within which the terminal device is located at a time preceding the time at which the first radio signal is transmitted between the transceiver and the terminal device,
    receive, from the terminal device, a preceding radio signal response signal indicating a reception power of the preceding radio signal as detected by the terminal device,
    transmit a following radio signal over a second one of the plurality of predetermined geographical regions other than the one of the plurality of predetermined geographical regions within which the terminal device is located at a time following the time at which the first radio signal is transmitted between the transceiver and the terminal device, and
    receive, from the terminal device, a following radio signal response signal indicating a reception power of the following radio signal as detected by the terminal device; and
    the controller is operable to determine, on the basis of a comparison of the indicated reception power of the first radio signal, the preceding radio signal and the following radio signal that the terminal device is located within the one of the plurality of predetermined geographical regions within which the terminal device is located.

13. Infrastructure equipment according to any one of clauses 5 to 8, wherein:
    the transceiver is operable to
    transmit a preceding radio signal over a first one of the plurality of predetermined geographical regions other than the one of the plurality of predetermined geographical regions within which the terminal device is located at a time preceding the time at which the first radio signal is transmitted between the transceiver and the terminal device, and
    transmit a following radio signal over a second one of the plurality of predetermined geographical regions other than the one of the plurality of predetermined geographical regions within which the terminal device is located at a time following the time at which the first radio signal is transmitted between the transceiver and the terminal device, and
    the controller is operable to determine, on the basis of a reception power of the first radio signal as detected by the terminal device, a reception power of the preceding radio signal as detected by the terminal device and a reception power of the following radio signal as detected by the terminal device, the one of the plurality of predetermined geographical regions within which the terminal device is located, wherein the reception power of each of the first radio signal, preceding radio signal and following radio signal are indicated by the second radio signal.

14. Infrastructure equipment according to clause 12 or 13, wherein the controller is operable to determine, on the basis of a comparison of the indicated reception power of the first radio signal, the preceding radio signal and the following radio signal an approximate location of the terminal device within the one of the plurality of predetermined geographical regions within which the terminal device is located.

15. Infrastructure equipment according to any preceding clause, wherein the controller is operable to:
    determine a round trip time (RTT) on the basis of a time duration between transmission of one radio signal to the terminal device and reception of another radio signal from the terminal device, the another radio signal being transmitted by the terminal device in response to the terminal device receiving the one radio signal; and
    determine a distance of the terminal device from the eNB on the basis of the determined round trip time; and
    on the basis of the determined distance, determine an approximate location of the terminal device within the one of the plurality of predetermined geographical regions within which the terminal device is located.

16. Infrastructure equipment according to any preceding clause, wherein when the terminal device located within the one of the plurality of predetermined geographical regions is simultaneously located within one of a plurality of predetermined geographical regions associated with another infrastructure equipment, each of the plurality of predetermined geographical regions associated with the other infrastructure equipment being associated with a different respective value of one or more predetermined parameters which is indicative of that predetermined geographical region:
    the transceiver is operable to receive a third radio signal from the terminal device, the third radio signal being generated by the terminal device on the basis of the value of the one or more predetermined parameters indicative of the one of the plurality of predetermined geographical regions associated with the other infrastructure equipment within which the terminal device is located; and
    the controller is operable to determine, on the basis of the second and third radio signals, an approximate location of the terminal device on the basis of a region of overlap of a geographical coverage area of the one of the plurality of predetermined geographical regions within which the terminal device is located and a geographical coverage area of the one of the plurality of predetermined geographical regions associated with the other infrastructure equipment within which the terminal device is simultaneously located.

17. Infrastructure equipment according to clause 16, wherein the second and third radio signals are the same, single, radio signal.

18. Infrastructure equipment according to clause 17, wherein:
    the one or more predetermined parameters of which a value is indicative of the one of the plurality of predetermined geographical regions within which the terminal device is located includes a first predetermined geographical region identifier, the first predetermined geographical region identifier identifying the geographical coverage area of the one of the plurality of predetermined geographical regions within which the terminal device is located;
    the one or more predetermined parameters of which a value is indicative of the one of the plurality of predetermined geographical regions associated with the other infrastructure equipment within which the terminal device is simultaneously located includes a second predetermined geographical region identifier, the second predetermined geographical region identifier identifying the geographical coverage area of the one of the plurality of predetermined geographical regions associated with the other infrastructure equipment within which the terminal device is located;

the second and third radio signals indicate the region of overlap between the geographical coverage areas of the one of the plurality of predetermined geographical regions within which the terminal device is located and the one of the plurality of predetermined geographical regions associated with the other infrastructure equipment within which the terminal device is simultaneously located.

19. A terminal device for use with a wireless telecommunications system, the terminal device comprising:

a receiver operable to receive, when the terminal device is located within one of a plurality of predetermined geographical regions, a first radio signal from infrastructure equipment;

a controller operable to determine, on the basis of the first radio signal, the value of one or more predetermined parameters indicative of the one of the plurality of predetermined geographical regions within which the terminal device is located, each of the plurality of predetermined geographical regions being associated with a different respective value of the one or more predetermined parameters which is indicative of that predetermined geographical region; and a transmitter operable to transmit a second radio signal to the infrastructure equipment, the second radio signal being generated by the controller on the basis of the value of the one or more predetermined parameters indicative of the one of the plurality of predetermined geographical regions within which the terminal device is located, wherein the one of the plurality of predetermined geographical regions within which the terminal device is located is determinable by the infrastructure equipment on the basis of the second radio signal.

20. A terminal device according to clause 19, wherein:

the one or more predetermined parameters of which a value is indicative of the one of the plurality of predetermined geographical regions within which the terminal device is located include a predetermined geographical region identifier;

the first radio signal indicates a predetermined geographical region identifier value indicative of the one of the plurality of predetermined geographical regions within which the terminal device is located; and the second radio signal indicates the predetermined geographical region identifier value indicated by the first radio signal.

21. A terminal device according to clause 20, wherein the first radio signal indicates the predetermined geographical region identifier value as explicit information in the first radio signal.

22. A terminal device according to clause 20, wherein the first radio signal indicates the predetermined geographical region identifier value on the basis of a scrambling code used for scrambling the first radio signal.

23. A terminal device according to any one of clauses 19 to 22, wherein:

the one or more predetermined parameters of which a value is indicative of the one of the plurality of predetermined geographical regions within which the terminal device is located includes a parameter indicative of a time at which the first radio signal is transmitted from the infrastructure equipment to the receiver; and the second radio signal indicates the value of the parameter indicative of the time at which the first radio signal is transmitted from the infrastructure equipment to the receiver.

24. A terminal device according to clause 23, wherein:

the parameter indicative of the time at which the first radio signal is transmitted from the infrastructure equipment to the receiver is a time position of one or more radio resources in a radio frame used for transmission of the first radio signal from the infrastructure equipment to the receiver, each of the plurality of predetermined geographical regions being associated with one or more radio resources at different respective time positions in the radio frame.

25. A terminal device according to clause 24, wherein the second radio signal comprises an identifier of the one or more radio resources used for transmission of the first radio signal from the infrastructure equipment to the receiver.

26. A terminal device according to clause 24, wherein the controller is operable to control the transmitter to transmit the second radio signal using one or more radio resources at a time position in the radio frame used for transmission of the second radio signal which is separate, by a predetermined time period, from the time position in the radio frame used for transmission of the first radio signal of the one or more radio resources used for transmission of the first radio signal from the infrastructure equipment to the receiver.

27. A terminal device according to any one of clauses 24 to 28, wherein:

the first radio signal is transmitted by the infrastructure equipment in a continuously varying direction over a time period occupied by the one or more radio resources in the radio frame used for transmission of the first radio signal from the infrastructure equipment to the receiver; and the controller is operable to:

determine a time during the time period occupied by the one or more radio resources in the radio frame used for transmission of the first radio signal at which a predetermined event associated with the first radio signal occurs; and control the transmitter to indicate the determine time in the second radio signal.

28. A terminal device according to clause 27, wherein the predetermined event associated with the first radio signal is a local maximum reception power.

29. A terminal device according to clause 27, wherein the predetermined event associated with the first radio signal is a local minimum reception power, the local minimum reception power being indicative of the presence of a notch in the radiation pattern used by the infrastructure equipment to transmit the first radio signal over the one of the plurality of predetermined geographical areas within which the terminal device is located.

30. A terminal device according to any one of clauses 24 to 26, wherein:

the second radio signal is indicative of a reception power of the first radio signal as detected by the controller;

the receiver is operable to receive, from the infrastructure equipment, a preceding radio signal over a first one of the plurality of predetermined geographical regions other than the one of the plurality of predetermined geographical regions within which the terminal device is located at a time preceding the time at which the first radio signal is transmitted from the infrastructure equipment to the receiver, and the transmitter is operable to transmit, to the infrastructure equipment, a preceding radio signal response signal indicating a reception power of the preceding radio signal as detected by the controller, the receiver is operable to receive, from the infrastructure equipment, a following radio signal over a second one of the plurality of predetermined geographical regions other than the one of the plurality of predetermined geographical regions within which the terminal device is located at a time following the time at which the first radio signal is transmitted from the infrastructure equipment to the receiver, and the transmitter is operable to transmit, to the infrastructure equipment, a following radio signal response signal indicating a reception power of the following radio signal as detected by the controller.

31. A terminal device according to any one of clauses 24 to 26, wherein:

the receiver is operable to receive, from the infrastructure equipment, a preceding radio signal over a first one of the plurality of predetermined geographical regions other than the one of the plurality of predetermined geographical regions within which the terminal device is located at a time preceding the time at which the first radio signal is transmitted from the infrastructure equipment to the receiver, and receive, from the infrastructure equipment, a following radio signal over a second one of the plurality of predetermined geographical regions other than the one of the plurality of predetermined geographical regions within which the terminal device is located at a time following the time at which the first radio signal is transmitted from the infrastructure equipment to the receiver, and the controller is operable to determine a reception power of the first radio signal, a reception power of the preceding radio signal and a reception power of the following radio signal and to control the transmitter to indicate the determined reception power of each of the first radio signal, preceding radio signal and following radio signal using the second radio signal.

32. A terminal device according to any one of clauses 19 to 31, wherein, when the terminal device is located within the one of the plurality of predetermined geographical regions and is simultaneously located within one of a plurality of predetermined geographical regions associated with another infrastructure equipment, each of the plurality of predetermined geographical regions associated with the other infrastructure equipment being associated with a different respective value of one or more predetermined parameters which is indicative of that predetermined geographical region:

the receiver is operable to receive another first radio signal from the other infrastructure equipment;

the controller is operable to determine, on the basis of the other first radio signal, the value of one or more predetermined parameters indicative of the one of the plurality of predetermined geographical regions associated with the other infrastructure equipment within which the terminal device is located, each of the plurality of predetermined geographical regions associated with the other infrastructure equipment being associated with a different respective value of the one or more predetermined parameters which is indicative of that predetermined geographical region; and the transmitter is operable to transmit a third radio signal to the infrastructure equipment, the third radio signal being generated by the controller on the basis of the value of the one or more predetermined parameters indicative of the one of the plurality of predetermined geographical regions associated with the other infrastructure equipment within which the terminal device is located, wherein the infrastructure equipment is operable to determine, on the basis of the second and third radio signals, an approximate location of the terminal device on the basis of a region of overlap of a geographical coverage area of the one of the plurality of predetermined geographical regions within which the terminal device is located and a geographical coverage area of the one of the plurality of predetermined geographical regions associated with the other infrastructure equipment within which the terminal device is simultaneously located.

33. A terminal device according to clause 32, wherein the second and third radio signals are the same radio signal.

34. A terminal device according to clause 33, wherein:

the one or more predetermined parameters of which a value is indicative of the one of the plurality of predetermined geographical regions within which the terminal device is located includes a first predetermined geographical region identifier, the first predetermined geographical region identifier identifying the geographical coverage area of the one of the plurality of predetermined geographical regions within which the terminal device is located;

the one or more predetermined parameters of which a value is indicative of the one of the plurality of predetermined geographical regions associated with the other infrastructure equipment within which the terminal device is simultaneously located includes a second predetermined geographical region identifier, the second predetermined geographical region identifier identifying the geographical coverage area of the one of the plurality of predetermined geographical regions associated with the other infrastructure equipment within which the terminal device is located;

the controller is operable to determine, on the basis of the first and second predetermined geographical region identifiers, the region of overlap between the geographical coverage areas of the one of the plurality of predetermined geographical regions within which the terminal device is located and the one of the plurality of predetermined geographical regions associated with the other infrastructure equipment within which the terminal device is simultaneously located, and to control the transmitter to indicate the determined region of overlap using the second and third radio signals;

the second radio signal and the third radio signal indicate the determine region of overlap.

35. A method of operating infrastructure equipment for use with a wireless telecommunications system, the method comprising:

controlling a transmitter to transmit a first radio signal to a terminal device located within one of a plurality of predetermined geographical regions, wherein the value of one or more predetermined parameters indicative of the one of the plurality of predetermined geographical regions within which the terminal device is located is determinable by the terminal device on the basis of the first radio signal, each of the plurality of predetermined geographical regions being associated with a different respective value of the one or more predetermined parameters which is indicative of that predetermined geographical region;

controlling a receiver to receive a second radio signal from the terminal device located within the one of the plurality of predetermined geographical regions, the second radio signal being generated by the terminal device on the basis of the value of the one or more predetermined parameters indicative of the one of the plurality of predetermined geographical regions, the value of the one or more predetermined parameters being determined by the terminal device on the basis of the first radio signal; and determining the one of the plurality of predetermined geographical regions within which the terminal device is located on the basis of the second radio signal.

36. A method of operating a terminal device for use with a wireless telecommunications system, the method comprising:

controlling a receiver to receive, when the terminal device is located within one of a plurality of predetermined geographical regions, a first radio signal from infrastructure equipment;

determining, on the basis of the first radio signal, the value of one or more predetermined parameters indicative of the one of the plurality of predetermined geographical regions within which the terminal device is located, each of the plurality of predetermined geographical regions being associated with a different respective value of the one or more predetermined parameters which is indicative of that predetermined geographical region; and controlling a transmitter to transmit a second radio signal to the infrastructure equipment, the second radio signal being generated on the basis of the value of the one or more predetermined parameters indicative of the one of the plurality of predetermined geographical regions within which the terminal device is located, wherein the one of the plurality of predetermined geographical regions within which the terminal device is located is determinable by the infrastructure equipment on the basis of the second radio signal.

37. Integrated circuitry for infrastructure equipment for use with a wireless telecommunications system, the integrated circuitry comprising:

a transmitter element operable to transmit a first radio signal to a terminal device located within one of a plurality of predetermined geographical regions, wherein the value of one or more predetermined parameters indicative of the one of the plurality of predetermined geographical regions within which the terminal device is located is determinable by the terminal device on the basis of the first radio signal, each of the plurality of predetermined geographical regions being associated with a different respective value of the one or more predetermined parameters which is indicative of that predetermined geographical region;

a receiver element operable to receive a second radio signal from the terminal device located within the one of the plurality of predetermined geographical regions, the second radio signal being generated by the terminal device on the basis of the value of the one or more predetermined parameters indicative of the one of the plurality of predetermined geographical regions, the value of the one or more predetermined parameters being determined by the terminal device on the basis of the first radio signal; and a controller element operable to determine the one of the plurality of predetermined geographical regions within which the terminal device is located on the basis of the second radio signal.

38. Integrated circuitry for a terminal device for use with a wireless telecommunications system, the integrated circuitry comprising:

a receiver element operable to receive, when the terminal device is located within one of a plurality of predetermined geographical regions, a first radio signal from infrastructure equipment;

a controller element operable to determine, on the basis of the first radio signal, the value of one or more predetermined parameters indicative of the one of the plurality of predetermined geographical regions within which the terminal device is located, each of the plurality of predetermined geographical regions being associated with a different respective value of the one or more predetermined parameters which is indicative of that predetermined geographical region; and a transmitter element operable to transmit a second radio signal to the infrastructure equipment, the second radio signal being generated by the controller element on the basis of the value of the one or more predetermined parameters indicative of the one of the plurality of predetermined geographical regions within which the terminal device is located, wherein the one of the plurality of predetermined geographical regions within which the terminal device is located is determinable by the infrastructure equipment on the basis of the second radio signal.

It will be appreciated that numerous modifications and variations of the present disclosure are possible in light of the above teachings. It is therefore to be understood that within the scope of the appended claims, the disclosure may be practiced otherwise than as specifically described herein.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure.

It will be appreciated that the above description for clarity has described embodiments with reference to different functional units, circuitry and/or processors. However, it will be apparent that any suitable distribution of functionality between different functional units, circuitry and/or processors may be used without detracting from the embodiments.

Described embodiments may be implemented in any suitable form including hardware, software, firmware or any combination of these. Described embodiments may optionally be implemented at least partly as computer software running on one or more data processors and/or digital signal processors. The elements and components of any embodiment may be physically, functionally and logically implemented in any suitable way. Indeed the functionality may be implemented in a single unit, in a plurality of units or as part of other functional units. As such, the disclosed embodiments may be implemented in a single unit or may be physically and functionally distributed between different units, circuitry and/or processors.

Although the present disclosure has been described in connection with some embodiments, it is not intended to be limited to the specific form set forth herein. Additionally, although a feature may appear to be described in connection with particular embodiments, one skilled in the art would recognize that various features of the described embodiments may be combined in any manner suitable to implement the technique.

REFERENCES

[1] Holma H. and Toskala A, "LTE for UMTS OFDMA and SC-FDMA based radio access", John Wiley and Sons, 2009
[2] "LTE: The UMTS Long Term Evolution 2nd edition". Stefania Sesia, Matthew Baker et al., Wiley.
[3] RP-160671, "New SID Proposal: Study on New Radio Access Technology," NTT DOCOMO, RAN #71
[4] R1-162895 "Support for Beam Based Common Control Plane in 5G New Radio". Nokia. RAN1#84bis. Busan, Korea. 11-15 Apr. 2016.
[5] R2-163443 "On beam sweeping and its implications". Nokia. RAN2#94. Nanjing, China. 23-27 May 2016
[6] R1-165364 "Support for Beam Based Common Control Plane". Nokia. RAN1#85. Nanjing, China. 23-27 May 2016
[7] European Patent Application No. 16177187.8

The invention claimed is:

1. Infrastructure equipment for use with a wireless telecommunications system, the infrastructure equipment comprising:
a transmitter configured to transmit a first radio signal to a terminal device located within one of a plurality of predetermined geographical regions, wherein the value of one or more predetermined parameters indicative of the one of the plurality of predetermined geographical regions within which the terminal device is located is determinable by the terminal device on the basis of the first radio signal, each of the plurality of predetermined geographical regions being associated with a different respective value of the one or more predetermined parameters which is indicative of that predetermined geographical region;
a receiver configured to receive a second radio signal from the terminal device located within the one of the plurality of predetermined geographical regions, the second radio signal being generated by the terminal device on the basis of the value of the one or more predetermined parameters indicative of the one of the plurality of predetermined geographical regions, the value of the one or more predetermined parameters being determined by the terminal device on the basis of the first radio signal; and
circuitry configured to determine the one of the plurality of predetermined geographical regions within which the terminal device is located on the basis of the second radio signal, wherein
the one or more predetermined parameters of which a value is indicative of the one of the plurality of predetermined geographical regions within which the terminal device is located includes a parameter indicative of a time at which the first radio signal is transmitted, and
the second radio signal indicates the value of the parameter indicative of the time at which the first radio signal is transmitted.

2. The infrastructure equipment according to claim 1, wherein:
the one or more predetermined parameters of which a value is indicative of the one of the plurality of predetermined geographical regions within which the terminal device is located include a predetermined geographical region identifier;
the first radio signal indicates a predetermined geographical region identifier value indicative of the one of the plurality of predetermined geographical regions within which the terminal device is located; and
the second radio signal indicates the predetermined geographical region identifier value indicated by the first radio signal.

3. The infrastructure equipment according to claim 2, wherein
the first radio signal indicates the predetermined geographical region identifier value as explicit information in the first radio signal.

4. The infrastructure equipment according to claim 2, wherein
the first radio signal indicates the predetermined geographical region identifier value on the basis of a scrambling code used for scrambling the first radio signal.

5. The infrastructure equipment according to claim 1, wherein:
the parameter indicative of the time at which the first radio signal is transmitted and the terminal device is a time position of one or more radio resources in a radio frame used for transmission of the first radio signal and the terminal device, each of the plurality of predetermined geographical regions being associated with one or more radio resources at different respective time positions in the radio frame.

6. The infrastructure equipment according to claim 5, wherein
the second radio signal comprises an identifier of the one or more radio resources used for transmission of the first radio signal, and
the circuitry is configured to determine the one of the plurality of predetermined geographical locations within which the terminal device is located on the basis of the one or more radio resources identified by the second radio signal.

7. The infrastructure equipment according to claim 5, wherein
the circuitry is configured to determine the one of the plurality of predetermined geographical locations within which the terminal device is located on the basis of a time position of one or more radio resources in the radio frame used for transmission of the second radio signal, the time position of the one or more radio resources in the radio frame used for transmission of the second radio signal and the time position of the one or more radio resources in the radio frame used for transmission of the first radio signal being separated by a predetermined time period.

8. The infrastructure equipment according to claim 5, wherein:
the first radio signal is transmitted in a continuously varying direction over a time period occupied by the one or more radio resources in the radio frame used for transmission of the first radio signal, and
the second radio signal indicates a time during the time period occupied by the one or more radio resources in the radio frame used for transmission of the first radio signal at which a predetermined event associated with the first radio signal is detected by the terminal device; and
the circuitry is configured to determine a position of the terminal device within the one of the plurality of predetermined geographical regions within which the terminal device is located on the basis of the time indicated by the second radio signal.

9. The infrastructure equipment according to claim 8, wherein
the predetermined event associated with the first radio signal is the detection of a local maximum reception power by the terminal device.

10. The infrastructure equipment according to claim 8, wherein:
the transmitter is configured to transmit the first radio signal over the one of the plurality of geographical areas within which the terminal device is located using a radiation pattern comprising a notch; and
the predetermined event associated with the first radio signal is the detection of a local minimum reception power by the terminal device, the local minimum reception power being indicative of the presence of the notch in the radiation pattern.

11. The infrastructure equipment according to claim 1, wherein:
the second radio signal is indicative of a reception power of the first radio signal as detected by the terminal device,
the transmitter is configured to transmit a preceding radio signal over a first one of the plurality of predetermined geographical regions other than the one of the plurality of predetermined geographical regions within which the terminal device is located at a time preceding the time at which the first radio signal is transmitted,
the receiver is configured to receive, from the terminal device, a preceding radio signal response signal indicating a reception power of the preceding radio signal as detected by the terminal device,
the transmitter is configured to transmit a following radio signal over a second one of the plurality of predetermined geographical regions other than the one of the plurality of predetermined geographical regions within which the terminal device is located at a time following the time at which the first radio signal is transmitted,
the receiver is configured to receive, from the terminal device, a following radio signal response signal indicating a reception power of the following radio signal as detected by the terminal device, and
the circuitry is configured to determine, on the basis of a comparison of the indicated reception power of the first radio signal, the preceding radio signal and the following radio signal that the terminal device is located within the one of the plurality of predetermined geographical regions within which the terminal device is located.

12. The infrastructure equipment according to claim 1, wherein:
the transmitter is configured to
transmit a preceding radio signal over a first one of the plurality of predetermined geographical regions other than the one of the plurality of predetermined geographical regions within which the terminal device is located at a time preceding the time at which the first radio signal is transmitted, and
transmit a following radio signal over a second one of the plurality of predetermined geographical regions other than the one of the plurality of predetermined geographical regions within which the terminal device is located at a time following the time at which the first radio signal is transmitted, and the circuitry is configured to determine, on the basis of a reception power of the first radio signal as detected by the terminal device, a reception power of the preceding radio signal as detected by the terminal device and a reception power of the following radio signal as detected by the terminal device, the one of the plurality of predetermined geographical regions within which the terminal device is located, wherein the reception power of each of the first radio signal, preceding radio signal and following radio signal are indicated by the second radio signal.

13. The infrastructure equipment according to claim 12, wherein
the circuitry is configured to determine, on the basis of a comparison of the indicated reception power of the first radio signal, the preceding radio signal and the following radio signal an approximate location of the terminal device within the one of the plurality of predetermined geographical regions within which the terminal device is located.

14. The infrastructure equipment according to claim 1, wherein the circuitry is configured to:
determine a round trip time (RTT) on the basis of a time duration between transmission of one radio signal to the terminal device and reception of another radio signal from the terminal device, the another radio signal being transmitted by the terminal device in response to the terminal device receiving the one radio signal;
determine a distance of the terminal device from the eNB on the basis of the determined round trip time; and
on the basis of the determined distance, determine an approximate location of the terminal device within the one of the plurality of predetermined geographical regions within which the terminal device is located.

15. The infrastructure equipment according to claim 1, wherein when the terminal device located within the one of the plurality of predetermined geographical regions is simultaneously located within one of a plurality of predetermined geographical regions associated with another infrastructure equipment, each of the plurality of predetermined geographical regions associated with the other infrastructure equipment being associated with a different respective value of one or more predetermined parameters which is indicative of that predetermined geographical region:
the receiver is configured to receive a third radio signal from the terminal device, the third radio signal being generated by the terminal device on the basis of the value of the one or more predetermined parameters indicative of the one of the plurality of predetermined geographical regions associated with the other infrastructure equipment within which the terminal device is located; and
the circuitry is configured to determine, on the basis of the second and third radio signals, an approximate location of the terminal device on the basis of a region of overlap of a geographical coverage area of the one of the plurality of predetermined geographical regions within which the terminal device is located and a geographical coverage area of the one of the plurality of predetermined geographical regions associated with the other infrastructure equipment within which the terminal device is simultaneously located.

16. The infrastructure equipment according to claim 15, wherein
the second and third radio signals are the same, single, radio signal.

17. The infrastructure equipment according to claim 16, wherein:
- the one or more predetermined parameters of which a value is indicative of the one of the plurality of predetermined geographical regions within which the terminal device is located includes a first predetermined geographical region identifier, the first predetermined geographical region identifier identifying the geographical coverage area of the one of the plurality of predetermined geographical regions within which the terminal device is located;
- the one or more predetermined parameters of which a value is indicative of the one of the plurality of predetermined geographical regions associated with the other infrastructure equipment within which the terminal device is simultaneously located includes a second predetermined geographical region identifier, the second predetermined geographical region identifier identifying the geographical coverage area of the one of the plurality of predetermined geographical regions associated with the other infrastructure equipment within which the terminal device is located; and
- the second and third radio signals indicate the region of overlap between the geographical coverage areas of the one of the plurality of predetermined geographical regions within which the terminal device is located and the one of the plurality of predetermined geographical regions associated with the other infrastructure equipment within which the terminal device is simultaneously located.

18. A terminal device for use with a wireless telecommunications system, the terminal device comprising:
- a receiver configured to receive, when the terminal device is located within one of a plurality of predetermined geographical regions, a first radio signal from infrastructure equipment;
- circuitry configured to determine, on the basis of the first radio signal, the value of one or more predetermined parameters indicative of the one of the plurality of predetermined geographical regions within which the terminal device is located, each of the plurality of predetermined geographical regions being associated with a different respective value of the one or more predetermined parameters which is indicative of that predetermined geographical region; and
- a transmitter configured to transmit a second radio signal to the infrastructure equipment, the second radio signal being generated by the circuitry on the basis of the value of the one or more predetermined parameters indicative of the one of the plurality of predetermined geographical regions within which the terminal device is located, wherein the one of the plurality of predetermined geographical regions within which the terminal device is located is determinable by the infrastructure equipment on the basis of the second radio signal, wherein
- the one or more predetermined parameters of which a value is indicative of the one of the plurality of predetermined geographical regions within which the terminal device is located includes a parameter indicative of a time at which the first radio signal is transmitted, and
- the second radio signal indicates the value of the parameter indicative of the time at which the first radio signal is transmitted.

19. Circuitry for a terminal device for use with a wireless telecommunications system, the circuitry configured to:
- receive, when the terminal device is located within one of a plurality of predetermined geographical regions, a first radio signal from infrastructure equipment;
- determine, on the basis of the first radio signal, the value of one or more predetermined parameters indicative of the one of the plurality of predetermined geographical regions within which the terminal device is located, each of the plurality of predetermined geographical regions being associated with a different respective value of the one or more predetermined parameters which is indicative of that predetermined geographical region; and
- transmit a second radio signal to the infrastructure equipment, the second radio signal being generated by the circuitry on the basis of the value of the one or more predetermined parameters indicative of the one of the plurality of predetermined geographical regions within which the terminal device is located, wherein the one of the plurality of predetermined geographical regions within which the terminal device is located is determinable by the infrastructure equipment on the basis of the second radio signal, wherein
- the one or more predetermined parameters of which a value is indicative of the one of the plurality of predetermined geographical regions within which the terminal device is located includes a parameter indicative of a time at which the first radio signal is transmitted, and
- the second radio signal indicates the value of the parameter indicative of the time at which the first radio signal is transmitted.

* * * * *